United States Patent
Rouyer et al.

(10) Patent No.: US 7,324,461 B2
(45) Date of Patent: Jan. 29, 2008

(54) SELECTIVE TRANSMISSION RATE LIMITER FOR RAPID SPANNING TREE PROTOCOL

(75) Inventors: Jessy V. Rouyer, Addison, TX (US); Girish Chiruvolu, Plano, TX (US)

(73) Assignee: Alcatel Lucent, Paris (FR)

( * ) Notice: Subject to any disclaimer, the term of this patent is extended or adjusted under 35 U.S.C. 154(b) by 960 days.

(21) Appl. No.: 10/648,865

(22) Filed: Aug. 26, 2003

(65) Prior Publication Data

US 2005/0050220 A1 Mar. 3, 2005

(51) Int. Cl.
*H04L 12/28* (2006.01)

(52) U.S. Cl. ............... 370/254; 370/255; 370/256

(58) Field of Classification Search ............ None
See application file for complete search history.

(56) References Cited

U.S. PATENT DOCUMENTS

| | | | |
|---|---|---|---|
| 5,933,590 A | 8/1999 | Allen | |
| 6,262,977 B1 | 7/2001 | Seaman et al. | |
| 6,330,229 B1 | 12/2001 | Jain et al. | |
| 6,611,502 B1 * | 8/2003 | Seaman | 370/256 |
| 6,680,917 B1 | 1/2004 | Seaman | |
| 2002/0009092 A1 | 1/2002 | Seaman et al. | 370/406 |
| 2002/0023170 A1 | 2/2002 | Seaman et al. | 709/235 |
| 2003/0161275 A1 * | 8/2003 | Malhotra et al. | 370/256 |

OTHER PUBLICATIONS

IEEE Computer Society; IEEE Std. 802.1Q; IEEE Standards for Local and Metropolitan Area Networks; Virtual Bridged Local Area Networks; 2003 Edition; pp. title, 1-3, 152-206.

IEEE Computer Society; IEEE Std. 802.1s—2002 (Amendment to IEEE Std. 802.1Q, 1998 Edition); Standards for Local and Metropolitan Area Networks; Virtual Bridged Local Area Networks—Amendment 3: Multiple Spanning Trees; Dec. 31, 2002; pp. 1-222.

IEEE Standard for Local and Metropolitan Area Netwroks-Common Specifications, Part 3: Media Access Control (MAC) Bridges-Amendment 2: Rapid Reconfiguration (IEEE std. 802.1w-2001) pp. 1-108, 2001.

IEEE Standard for Local and Metropolitan Area Netwroks: Media Access Control (MAC) Bridges (IEEE std. P802.1 D/D2) pp. 1-290, Apr. 21, 2003.

IEEE Draft Standard for Local and Metropolitan Area Netwroks: Media Access Control (MAC) Bridges (IEEE std. P802.1 D/D3) pp. 1-264, Jun. 11, 2003.

* cited by examiner

*Primary Examiner*—Robert W. Wilson
(74) *Attorney, Agent, or Firm*—Bobby D. Slaton; William J. Tucker

(57) ABSTRACT

A network (e.g., RSTP-based network) and method are described herein that can selectively eliminate latencies in the exchange of to-be-transmitted control messages (e.g., BPDUs) between bridges during the re/convergence of the network. The method includes a step of classifying to-be-transmitted control messages as either low-priority control messages or high-priority control messages. The method also has a step of limiting the transmission rate of the low-priority control messages in accordance with a traditional IEEE 802.1 RSTP. And, the method also includes a step of immediately transmitting the high-priority control messages that contain information that contributes to the re/convergence of the network.

18 Claims, 20 Drawing Sheets

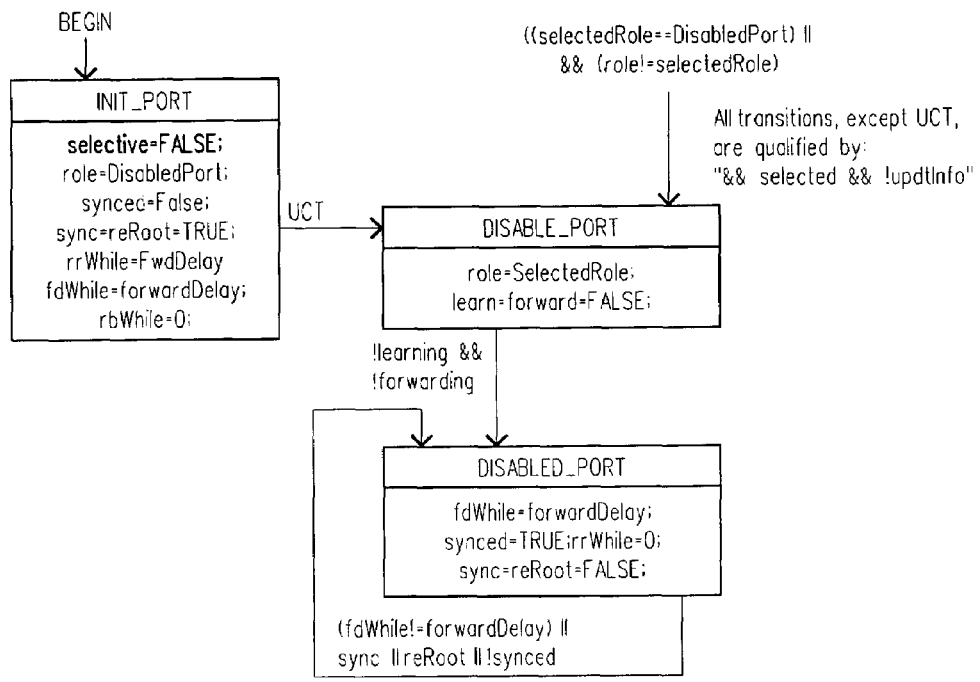
FIG. 7A
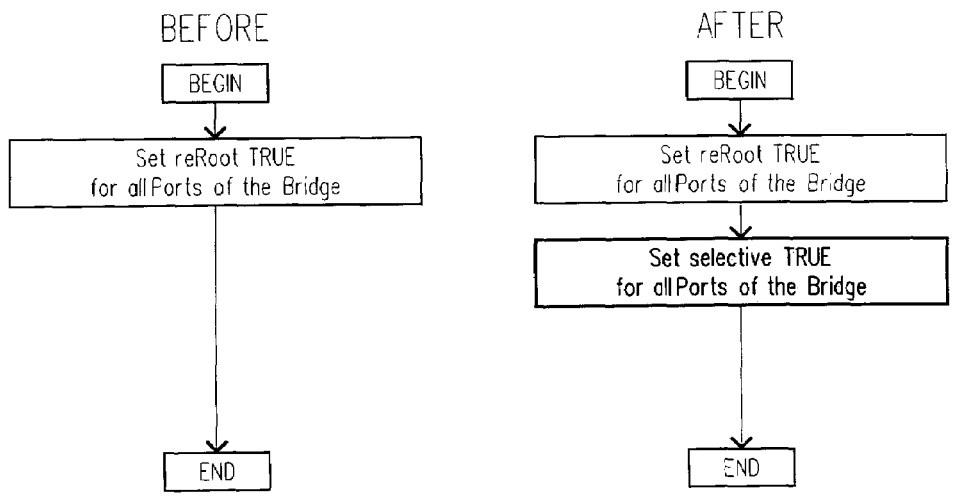
FIG. 7B (PRIOR ART)
FIG. 7C

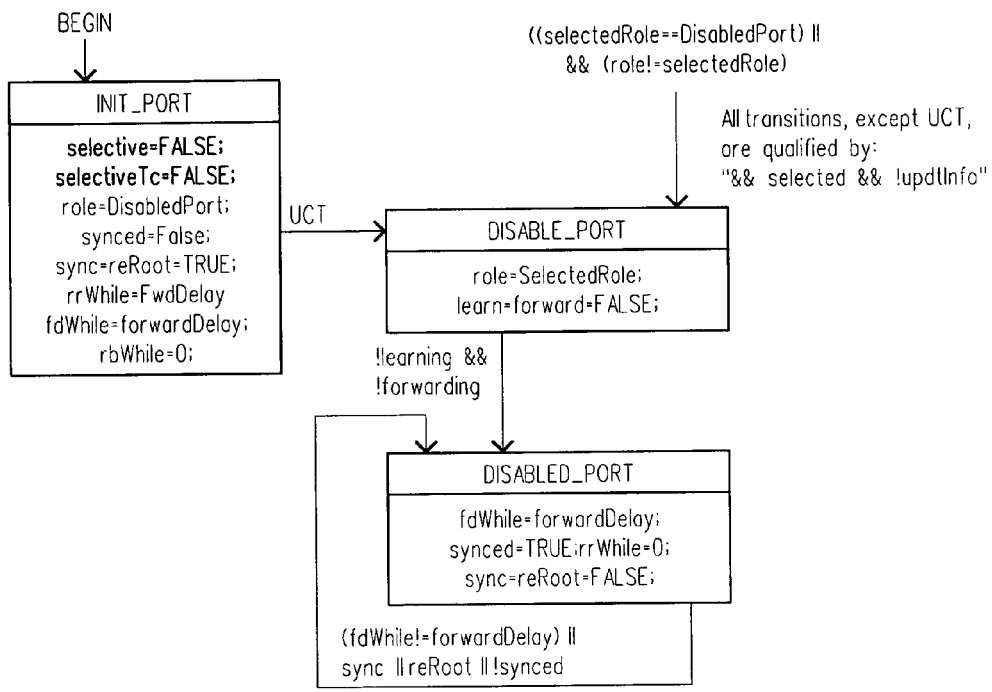
FIG. 8A
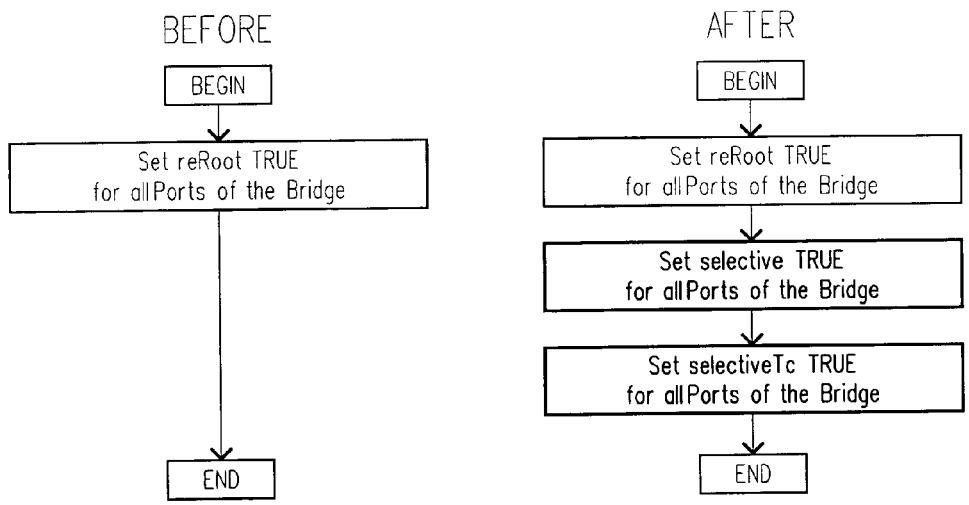
FIG. 8B (PRIOR ART)
FIG. 8C

SELECTIVE TRANSMISSION RATE LIMITER FOR RAPID SPANNING TREE PROTOCOL

BACKGROUND OF THE INVENTION

1. Field of the Invention

The present invention relates in general to local and metropolitan area networks and, in particular, to a method for selectively eliminating latencies in the exchange of control messages between bridges during the re/convergence of the network.

2. Description of Related Art

Computers are often connected together through a network (e.g., Local Area Network (LAN), Metropolitan Area Network (MAN)) that is made up of bridges (or any other device operating at layer 2 of the Open Systems Interconnection reference model) compliant with the IEEE 802.1 Rapid Spanning Tree Protocol (RSTP). The network provides for redundant connections where data transmitted from one bridge to another bridge is constrained to follow a loop-free path. To accomplish this the RSTP uses bridges within the network to reduce the physical topology of the network to an active topology that is both loop-free ('tree') and fully-connected ('spanning'). Unfortunately, the bridges can suffer from undesirable latencies when they have to communicate with one another in order for the topology to re/converge towards a spanning tree as directed by the RSTP.

The RSTP currently avoids these latencies instead of eliminating these latencies as done by the present invention. The avoidance is built into the current RSTP whose operation depends on the exchange of control messages known as Bridge Protocol Data Units (BPDUs) between bridges. Bridges are interconnected to one another by links. And, the BPDUs are transmitted on a link by a port of one of the bridges. The current RSTP limits the number of BPDUs that can be transmitted by a port. In particular, when the number of transmitted BPDUs per port (txCount) reaches a limit of txHoldCount BPDUs, the current RSTP prevents the next BPDU from being transmitted until txCount is decremented. Such a situation can create an undesirable latency.

The current RSTP is not good enough because its solution is not always successful at totally avoiding such latencies. As a consequence, the number of transmitted BPDUs is limited. In particular, the current RSTP increments txCount by 1 for each transmitted BPDU and decrements txCount by 1 at one-second intervals. If txCount is null, as many as txHoldCount BPDUs can be transmitted before txCount is decremented. If txHoldCount BPDUs have been transmitted and txCount has not been decremented, a port consequently has to wait at worse 1 second before the next BPDU can be transmitted. This is an undesirable feature of a transmission rate limiter like txHoldCount because BPDUs may not be immediately transmitted, which does not contribute to the re/convergence of an unstable topology towards a stable topology (a spanning tree). A delay of up to one second on a single port may translate into even longer delays in the re/convergence of the overall RSTP-based topology. Accordingly, there is a need for a method that can selectively eliminate such latencies in the exchange of BPDUs between bridges during the re/convergence of the network. This need and other needs are satisfied by the method, network and bridge of the present invention.

BRIEF DESCRIPTION OF THE INVENTION

The present invention includes a network (e.g., RSTP-based network) and method that can selectively eliminate latencies in the exchange of control messages (e.g., BPDUs) between bridges during the re/convergence of the network. The method includes a step of classifying control messages (that are scheduled for transmission) as either low-priority control messages or high-priority control messages. The method also has a step of limiting the transmission rate of the low-priority control messages in accordance with a traditional IEEE 802.1 RSTP. And, the method also includes a step of immediately transmitting the high-priority control messages that contain information that contributes to the re/convergence of the network.

BRIEF DESCRIPTION OF THE DRAWINGS

A more complete understanding of the present invention may be had by reference to the following detailed description when taken in conjunction with the accompanying drawings wherein:

FIGS. 7A-7G are flowcharts and diagrams that illustrate how to modify the traditional IEEE P802.1D-2003/D3 in accordance with Set#1 in TABLE #2 to implement method 300;

FIGS. 8A-8G are flowcharts and diagrams that illustrate how to modify the traditional IEEE P802.1D-2003/D3 in accordance with Set#2 in TABLE #2 to implement method 300;

DETAILED DESCRIPTION OF THE DRAWINGS

Referring to FIGS. 1-12, there are illustrated a network 100 (shown as a bridged local area network 100) and a method 300 for selectively eliminating latencies in the exchange of control messages within network 100 during the re/convergence of the network 100. Although the present invention is described below as being used in a RSTP-based Bridged LAN 100, it should be understood that the present invention can be used in other types of RSTP-based networks such as a RSTP-based Bridged Metropolitan Area Network (MAN). In fact, the present invention may be used in any type of network that incorporates a protocol relying on RSTP such as the Multiple Spanning Tree Protocol (MSTP). Accordingly, the network 100 and method 300 should not be construed in a limited manner.

Figure 1:
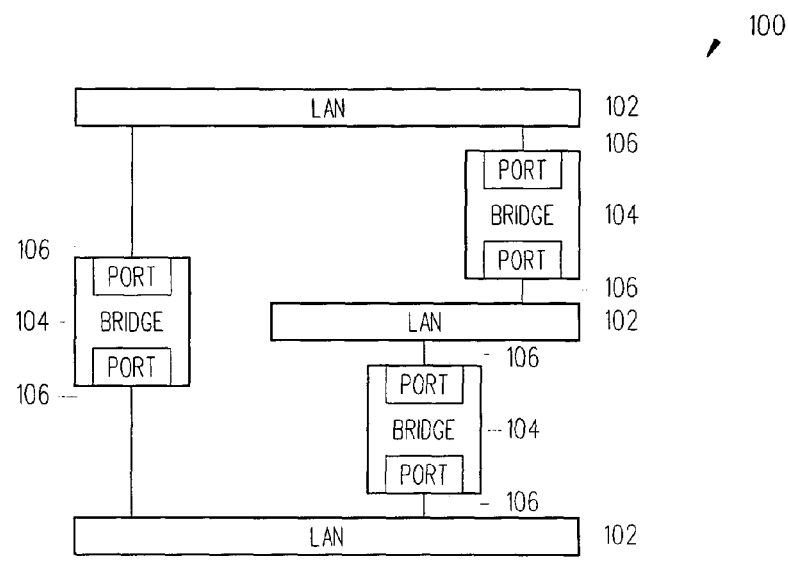
FIG. 1 is a block diagram that illustrates the physical topology of a network configured in accordance with the present invention.

Referring to FIG. 1, there is shown a block diagram that illustrates the physical topology of the network 100. The network 100 includes multiple LANS 102 (only three shown) that are interconnected to one another by Media Access Control (MAC) bridges 104 (only three shown). Each bridge 104 includes one or more ports 106 each of which is connected to one of the LANs 102. A more detailed discussion about the different components and the functions of those components that make up the network 100 is provided in IEEE P802.1D-2003/D3 (Jun. 11, 2003) the contents of which are incorporated by reference herein.

Figure 2:
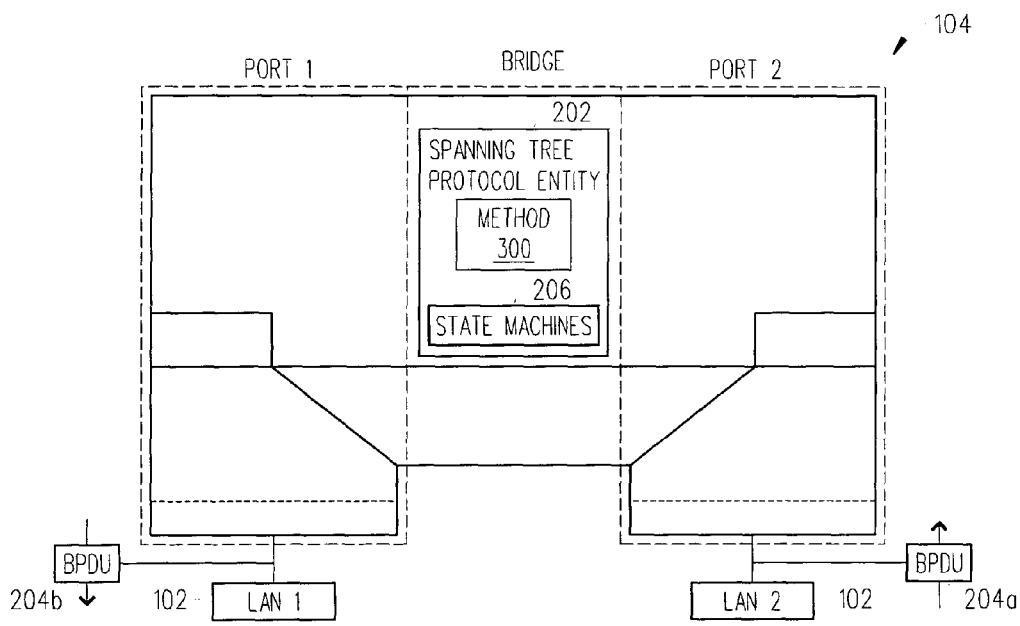
FIG. 2 is a block diagram that illustrates the architecture of a RSTP-based bridge located within the network shown in FIG. 1.

Referring to FIG. 2, there is shown a block diagram that illustrates the architecture of the bridge 104 (shown as a two-port bridge 104). The method 300 of the present invention primarily affects the spanning tree protocol entity 202 in the bridge 104. Basically, the method 300 eliminates latencies during the re/convergence of the network 100 after an event occurs within the network 100 such as when a bridge 104 (e.g., root bridge 104), port 106 or LAN 102 fails, is added to the network 100, or is removed from the network 100 (see FIGS. 4-6). The method 300 distinguishes between classes of control messages 204 (e.g., BPDUs 204) and limits the transmission rate of low-priority BPDUs 204*a* and immediately transmits high-priority BPDUs 204*b* that contain information that contributes to the re/convergence of the network 100 from an unstable topology to a stable topology. More details about the different steps of the method 300 and different examples of high-priority BPDUs 204*b* are provided below with respect to FIG. 3.

Figure 3:
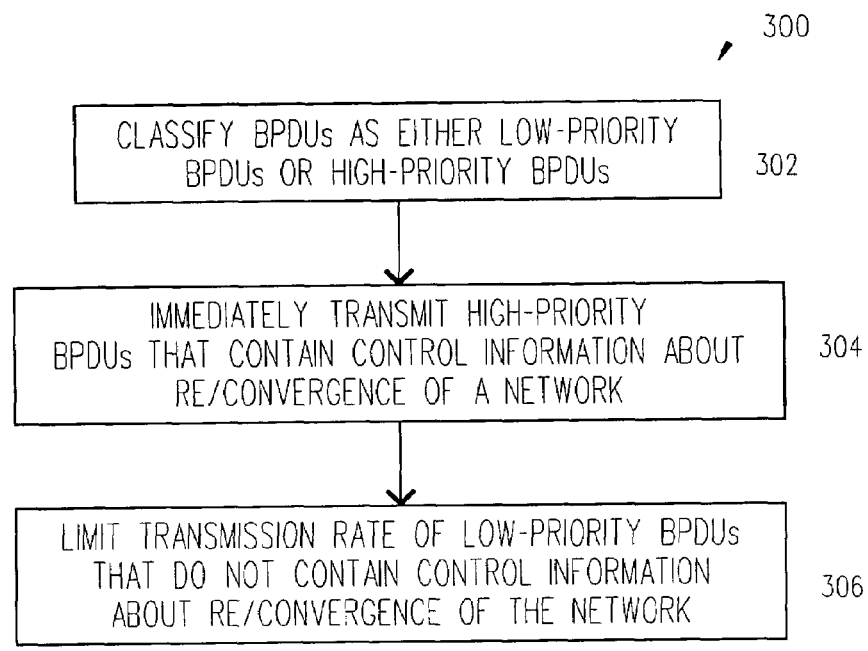
FIG. 3 is a flowchart illustrating the basic steps of a preferred method for selectively eliminating latencies in the exchange of control messages (e.g., BPDUs) between bridges during the re/convergence of a RSTP-based network shown in FIG. 1 in accordance with the present invention.

Referring to FIG. 3, there is a flowchart illustrating the basic steps of the preferred method 300 for selectively eliminating latencies in the exchange of BPDUs 204 during the re/convergence of the RSTP-based network 100. Beginning at step 302, one or more state machines 206 within each bridge 104 are used to, among other tasks, classify each of the to-be-transmitted BPDUs 204 as either a low-priority BPDU 204*a* or a high-priority BPDU 204*b*. A high-priority BPDU 204*b* is any control message that contains information that contributes to the re/convergence of the network 100. For example, the state machines 206 needed to implement method 300 would classify a to-be-transmitted BPDU as a high-priority BPDU 204*b* in the following situations: (1) a bridge 104 becomes a new root bridge 104; (2) a bridge 104 has to "reroot" (i.e. decide which other port 106 provides access towards a new root bridge 104); or (3) a bridge 104 has to advertise information about a new root bridge 104 (see the detailed discussion associated with FIGS. 4-6 for more information about these situations). BPDUs not classified as high-priority BPDU 204*b* are classified as low-priority BPDUs 204*a*.

At step 304, when there is a high-priority BPDU 204*b* to be transmitted, the state machines 206 are configured in a manner that enables this high-priority BPDU 204*b* to be immediately transmitted between bridges 104. For more details about one way the state machines 204 can be configured to perform step 304, reference is made to the discussion provided below with respect to FIGS. 7-12. Although only one state machine 206 is shown in FIG. 2, it is readily appreciated by those skilled in the art that there are many different state machines 206 used by the bridge 104. For example, the bridge 104 can use state machines 206 like a Port Transmit state machine and a Port Timers state machine (see discussion below and Chapter 17 in IEEE P802.1D-2003/D3 (Jun. 11, 2003)).

At step 306, the state machine 206 allows the value of the txCount parameter to reach but not exceed the value of the txHoldCount parameter when there is a low-priority BPDU 204*a* to transmit, which limits the transmission rate of the low-priority BPDUs 204*a* between bridges 104. In the preferred embodiment, the transmission rate of the low-priority BPDUs 204*a* is limited in accordance with the traditional IEEE 802.1 RSTP standard.

As described above, the method 300 selectively eliminates latencies by removing the restriction imposed by the traditional IEEE 802.1 RSTP on the txCount parameter by the txHoldCount parameter for high-priority BPDUs 204. In doing this, the method 300 classifies the BPDUs 204 into low- and high-priority classes on a per-port basis and then immediately transmits the high-priority BPDUs 204*b* while the transmission rate of the low-priority BPDUs 204*a* is limited as mandated by the traditional IEEE 802.1 RSTP.

The classes of low- and high- priority BPDUs 204*a* and 204*b* are mutually exclusive. As such, the definition of the class of high-priority BPDUs 204*b* is consequently sufficient to define both. High-priority BPDUs 204*b* encompass any BPDU 204 whose information, once transmitted, contributes to the re/convergence of an unstable RSTP-based topology to a stable one (spanning tree). As a consequence, high-priority BPDUs 204*b* appear when re/convergence is occurring. When a RSTP-based topology is stable, the BPDUs 204 are classified as low-priority BPDUs 204*a*.

Figure 4:
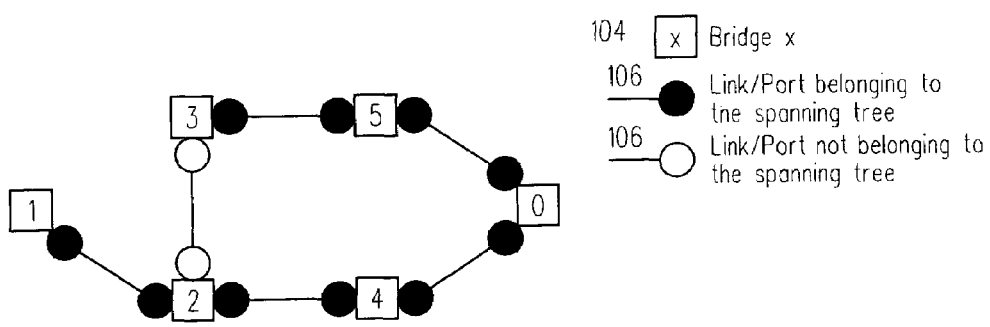
FIGS. 4-6 are diagrams that illustrate three exemplary networks in which the method 300 could be used to selectively eliminate latencies in the exchange of control messages (e.g., BPDUs) between bridges in accordance with the present invention.
Figure 5:
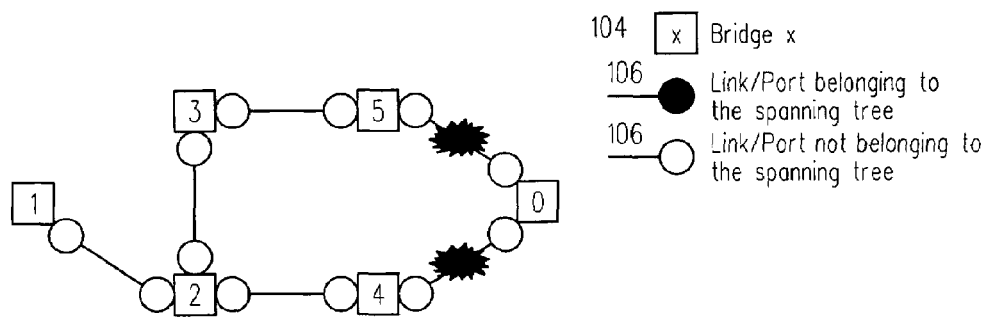
Figure 6:
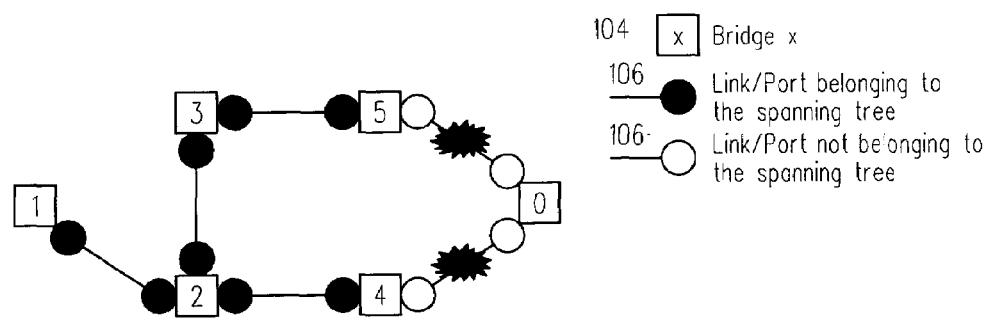

Referring to FIGS. 4-6, there are shown three exemplary networks where the immediate transmission of high-priority BPDUs 204*b* is desired. It should be appreciated that the identifiers used for bridges in FIGS. 4-6 are simpler than they would be in reality for the sake of simplicity). A globally unique Identifier (Id) identifies every bridge 104 of a topology. The present invention like the traditional RSTP elects the bridge 104 with the lowest Id as the root bridge 104 of the spanning tree. The spanning tree is built by preventing some of the ports 106 on the participating bridges 104 from forwarding data traffic. The path connecting a bridge 104 to the root bridge 104 is chosen as the lowest-cost path among all possible paths in the topology.

In FIG. 4, there is a diagram that represents a spanning tree where bridges 1, 2 and 4 are connected to root bridge 0 through a path while bridges 3 and 5 use another path. The path chosen to connect bridge 2 to root bridge 0 has a lower cost than the path that would go through bridges 3 and then 5. As mandated by the traditional RSTP and in this invention, if the communication links connecting the root bridge 0 to the rest of the topology are lost as shown in FIG. 5 then bridges 4 and 5 each become a 'temporary' root bridge and have to advertise what they consider as superior information to their neighbor(s), bridge 2 and 3 respectively in this case. If bridges 2 and 3 have to wait as they could in the traditional RSTP before transmitting a high-priority BPDU 204*b* containing such advertising information, then the reconvergence of the topology is delayed by at least the time they spend waiting for the transmission to start.

After some time, bridge 1 realizes that it is the new root bridge because its Id is the lowest among all connected bridges. Assuming bridge 1 can transmit a high-priority BPDU 204b advertising bridge 1 as the new root bridge to its neighbor, bridge 2, the latter will have to "reroot". Bridge 2 used to consider bridge 4 as the direction towards former root bridge 0. When it receives the high-priority BPDU 204b from bridge 1, bridge 2 now considers its port 106 connected to bridge 1 as providing the direction towards the new root bridge. This is "rerooting". Because of this, bridge 2 has to advertise new root bridge 1 to its downstream neighbors, bridges 3 and 4. If bridge 2 has to wait before transmitting a high-priority BPDU 204b advertising such information on the ports 106 connected to these neighbors, the reconvergence of the topology is delayed by at least the time bridge 2 spends waiting for the transmission to start.

During the reconvergence process and before bridge 1 became the new root bridge, bridge 2 became one as well and advertised itself to bridge 3, in particular. Bridge 3 accepted this information, "rerooted", as described for bridge 2 previously. When bridge 3 receives from bridge 2 a high-priority BPDU 204b advertising new root bridge 1, it does not reroot even though it has to advertise new root bridge 1 to its downstream neighbor, bridge 5. If bridge 3 has to wait before transmitting a high-priority BPDU 204b advertising such information on the ports 106 connected to this neighbor, the reconvergence of the topology is delayed by at least the time bridge 3 spends waiting for the transmission to start.

FIG. 6 illustrates a diagram that depicts the final configuration of the network after reconvergence. As described in the previous example, the present invention populates the class of high-priority control traffic with BPDUs 204b that carry superior information and are immediately transmitted when a bridge:

Becomes a new root bridge.

Reroots due to the fact that it received superior information from another bridge.

Does not reroot but still has to advertise new superior information.

This is a non-exhaustive list of members of the class of high-priority BPDUs 204b that will be complemented further in the rest of the document. When a situation occurs in which a BPDU 204 belonging to the class of high-priority control traffic should be transmitted and will not because the value of the txCount parameter is or will soon be equal to the value of the txHoldCount parameter, the method 300 allows for immediate transmission of high-priority BPDUs 204b and limits the transmission rate of low-priority BPDUs 204a. The method 300 like the traditional RSTP relies on a distributed algorithm and the RSTP-based bridges 104 do not know whether the surrounding topology is stable or not. It is only by detecting certain events that a bridge 104 knows that re/convergence is ongoing (e.g., see the yes/no steps in FIGS. 7E, 8E and 9C).

Below is a description about one way and variants including the use of Topology Change Pre-Notifications BPDUs (TCPNs) that one can use to implement method 300 by revising parts of the RSTP described in IEEE P802.1D-2003/D3 (Jun. 11, 2003). It should be noted that the notations used below and in FIGS. 7-12 are defined in TABLE #1:

TABLE #1

| Symbol | Interpretation |
| --- | --- |
| ( ) | Used to force the precedence of operators in Boolean expressions and to delimit the argument(s) of actions within state boxes. |

TABLE #1-continued

| Symbol | Interpretation |
| --- | --- |
| ; | Used as a terminating delimiter for actions within state boxes. Where are state box contains multiple actions, the order of execution follows the normal English language conventions for reading text. |
| = | Assignment action. The value of the expression to the right of the operator is assigned to the variable to the left of the operator. Where this operator is used to define multiple assignments, e.g., a = b = X the action causes the value of the expression following the right-most assignment operator to be assigned to all of the variables that appear to the left of the right-most assignment operator. |
| ! | Logical NOT operator. |
| && | Logical AND operator. |
| \|\| | Logical OR operator. |
| if . . . then . . . | Conditional action. If the Boolean expression following the if evaluates to TRUE, then the action following the then is executed. |
| != | Inequality. Evaluates to TRUE if the expression to the left of the operator is not equal in value to the expression to the right. |
| == | Equality. Evaluates to TRUE if expression to the left of the operator is equal in value to the expression to the right. |
| * | Arithmetic multiplication operator. |
| − | Arithmetic subtraction operator. |
| /* . . . */ | Comment. Indicates the action that should be taken where the comment appears. Such action may require further modifications in the state machine where the comment appears or in other state machines. |

For a boolean variable, the "reset" keyword means that the boolean variable should be initialized to FALSE, while the keyword "set" means that the boolean variable should be initialized to TRUE.

The different sets of modifications to IEEE P802.1D-2003/D3 that are possible to implement the proposed solution are summarized below in TABLE #2. Each set is further explained below. It should be appreciated that in TABLE #2 and in the rest of this document (until otherwise mentioned), RSTP is fully stable when bridges are connected by a spanning tree (as described in the standard) and txCount holds a value of 0 or 1 on all ports of all bridges in the topology. After initial convergence or after a reconvergence, it takes a few seconds before an incremented txCount comes back to 0 or 1. All references to BPDUs (Bridge Protocol Data Units) below are to Rapid Spanning Tree BPDUs unless otherwise mentioned (see also section 9.3.3 in IEEE P802.1D-2003/D3). And, each transmitted BPDU shall contain the following parameters and no others. Where a specific parameter value is indicated in this subclause, that parameter value shall be encoded in all transmitted BPDUs:

The Protocol Identifier is encoded in Octets 1 and 2. It takes the value 0000 0000 0000 0000.

The Protocol Version Identifier is encoded in Octet 3. It takes the value 0000 0010.

The BPDU Type is encoded in Octet 4. This field takes the value 0000 0010. This denotes a Rapid Spanning Tree BPDU.

The Topology Change flag is encoded in Bit 1 of Octet 5 (see 17.21.20 in IEEE P802.1D-2003/D3).

The Proposal flag is encoded in Bit 2 of Octet 5 (see 17.21.20 in IEEE P802.1D-2003/D3).

The Port Role is encoded in Bits 3 and 4 of Octet 5 (see 17.21.20 in IEEE P802.1D-2003/D3).

The Learning flag is encoded in Bit 5 of Octet 5 (see 17.21.20 in IEEE P802.1D-2003/D3).

The Forwarding flag is encoded in Bit 6 of Octet 5 (see 17.21.20 in IEEE P802.1D-2003/D3).
The Agreement flag is encoded in Bit 7 of Octet 5 (see 17.21.20 in IEEE P802.1D-2003/D3).
The Topology Change Acknowledgment flag is encoded in Bit 8 of Octet 5 as zero (see 17.21.20 in IEEE P802.1D-2003/D3).
The Root Identifier is encoded in Octets 6 through 13 (see 17.19.21, 17.21.20 in IEEE P802.1D-2003/D3).
The Root Path Cost is encoded in Octets 14 through 17 (see 17.19.21, 17.21.20 in IEEE P802.1D-2003/D3).
The Bridge Identifier is encoded in Octets 18 through 25. (see 17.19.21, 17.21.20 in IEEE P802.1D-2003/D3)
The Port Identifier is encoded in Octets 26 and 27 (see 17.19.21, 17.21.20 in IEEE P802.1D-2003/D3).
The Message Age timer value is encoded in Octets 28 and 29 (see 17.19.21, 17.21.20 in IEEE P802.1D-2003/D3).
The Max Age timer value is encoded in Octets 30 and 31 (see 17.19.21, 17.21.20 in IEEE P802.1D-2003/D3).
The Hello Time timer value is encoded in Octets 32 and 33 (see 17.19.21, 17.21.20 in IEEE P802.1D-2003/D3).
The Forward Delay timer value is encoded in Octets 34 and 35 (see 17.19.21, 17.21.20 in IEEE P802.1D-2003/D3).
The Version 1 Length value is encoded in Octet 36. It takes the value 0000 0000, which indicates that there is no Version 1 protocol information present.

TABLE #2

| Set # | Designed for | Requires |
|---|---|---|
| 1 | Selective transmission of BPDUs | 1 < txHoldCount <= 10 RSTP needs to be fully stable in the topology |
| 2 | What is achieved by Set #1 plus: Selective transmission of BPDUs with the Topology Change flag set ("TCNs") | Set #1 1 < txHoldCount <= 10 RSTP needs to be fully stable in the topology |
| 3 | What is achieved by Set #2 plus: Propagation of the first TCN | Set #2 1 <= txHoldCount <= 10 RSTP needs to be fully stable in the topology |
| 4 | What is achieved by Set #1 plus: Prenotification of the propagation of the first TCN | Set #1 1 <= txHoldCount <= 10 RSTP does not need to be fully stable in the topology |
| 5 | What is achieved by Set #4 plus: Port becoming enabled | Set #4 1 <= txHoldCount <= 10 RSTP does not need to be fully stable in the topology |
| 6 | What is achieved by Set #5 plus: Port becoming Alternate Discarding | Set #5 1 <= txHoldCount <= 10 RSTP does not need to be fully stable in the topology |

All descriptions of the different sets of modifications to IEEE P802.1D-2003/D3:

Set and reset variables on some or all ports of a bridge regardless of whether or not a port participates in the active spanning tree. Because the use made of such variables influences the transmission of BPDUs only on ports where such BPDUs should be transmitted, it is not necessary to reset those variables on ports where those variables are set and where such BPDUs should not be transmitted.

Assume that any received BPDU is processed in its entirety before new BPDUs are encoded for transmission. Such a measure reduces the number of BPDUs being transmitted and aims at preventing txCount from reaching its txHoldCount limit. Because BPDUs convey whatever information is available when they are generated for transmission, this does not alter RSTP behavior. If more than one BPDU is transmitted following reception of any BPDU but before such a BPDU is processed in its entirety, steps have to be taken to ensure proper working of the solution, which is an implementation issue, as the basic ideas remain identical.

Allow for the transmission of at most one (unless otherwise mentioned) extra BPDU with or without the Topology Change flag set. If the reliability of the transmission medium is such that some BPDUs may not be delivered, steps should be taken to ensure that at least two extra BPDUs are transmitted. The transmission of each BPDU should occur within a time frame allowing for proper delivery of information with a high probability. Care should be exercised to avoid transmitting BPDUs with the Topology Change flag set on a port where tcWhile==0.

Assume that bridges are interconnected by point-to-point links (or by shared media with at most two bridges attached).

Assume that the definition of the allsynced condition is "TRUE if and only if synced is TRUE for all Ports for the given Tree" with the "other than the given Port" trailer added at the end of the sentence (see section 17.20.3 in IEEE P802.1D-2003/D3) or any future definition that achieves the same goal.

SET#1: Selective Transmission of BPDUs

The following set of modifications (Set#1) allows the selective transmission of necessary BPDUs when a bridge:

Becomes a new Root Bridge.

Reroots due to the fact that it received superior information from another bridge.

Does not reroot but similarly has to advertise new superior information.

This can be achieved by setting a variable named "selective" when those conditions are met. Transmission of a necessary BPDU is allowed if the selective variable is set and if txCount has reached its txHoldCount limit. Possible set of modifications (Set#1) to allow selective transmission of BPDUs:

Define a boolean variable named selective for each port of a bridge.

Reset selective on all ports that are initialized (this can be done in the Port Role Transitions State Machine at the beginning of the INIT_PORT state by adding a "selective=FALSE;" statement (see FIG. 7A).

Modify the setReRootTree() procedure shown in FIG. 7B to be the procedure shown in FIG. 7C.

Figures 7D, 7E:
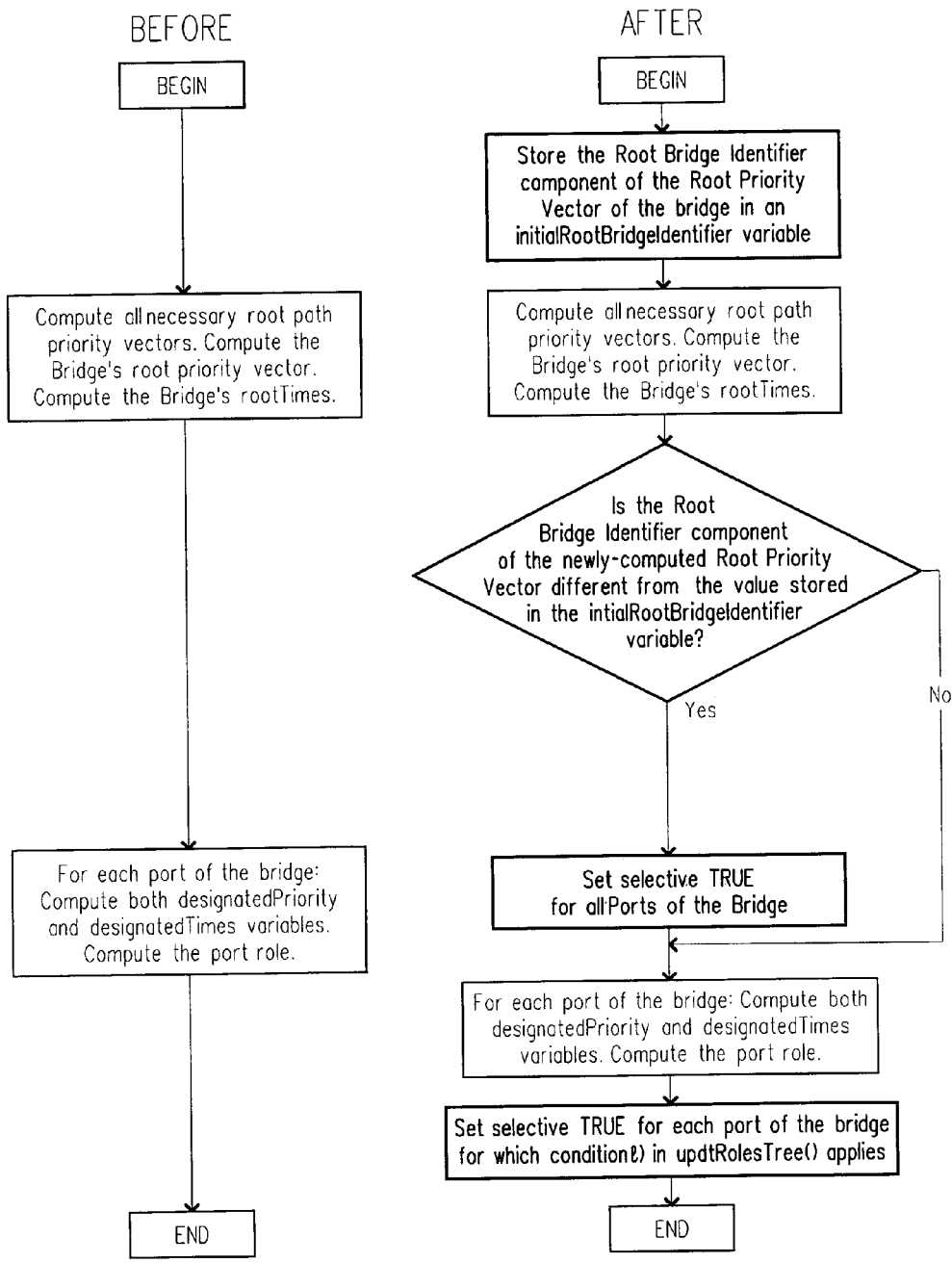

Modify the updtRolesTree() procedure shown in FIG. 7D to be the procedure shown in FIG. 7E.

Figure 7F:
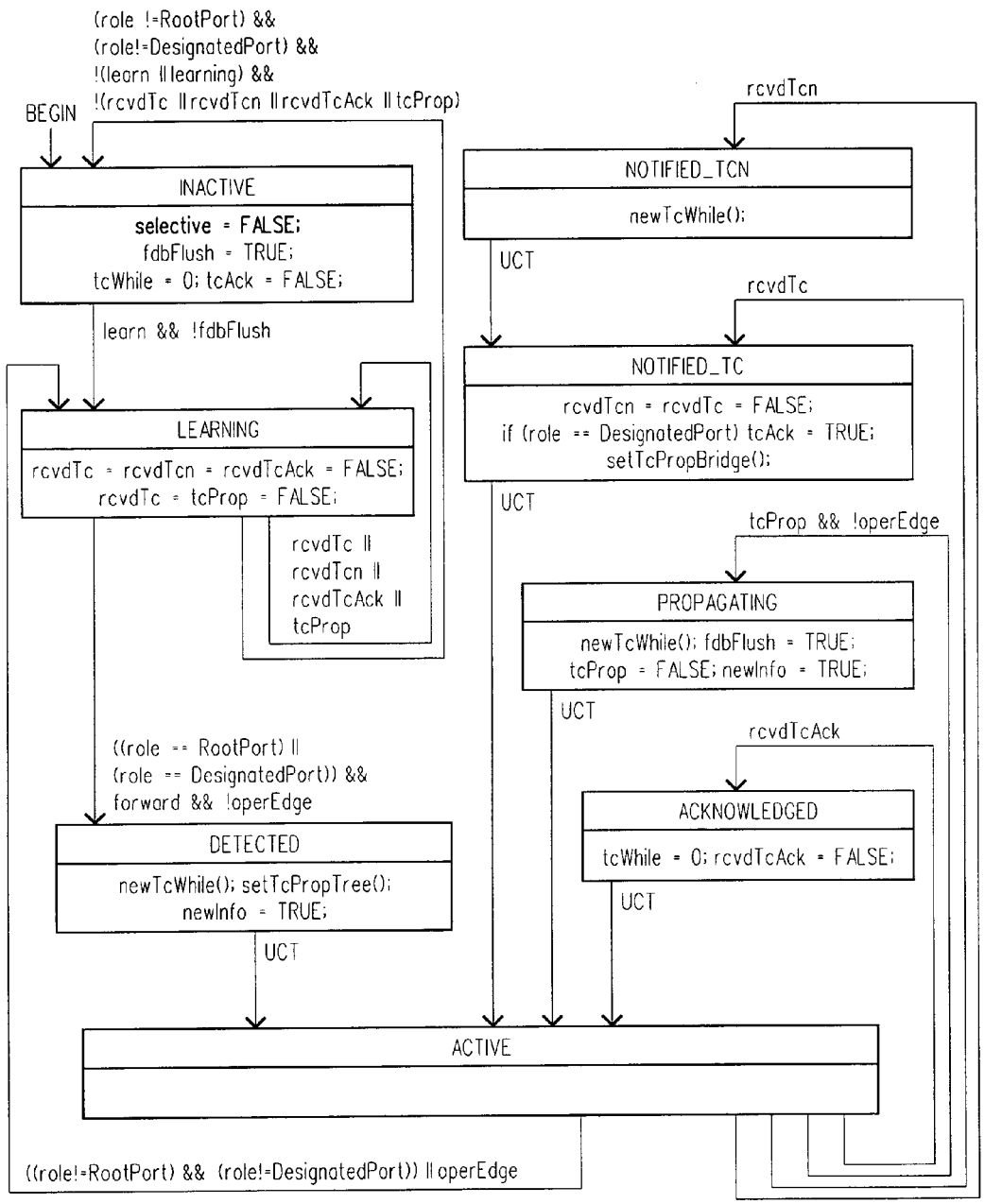
Figure 7G:
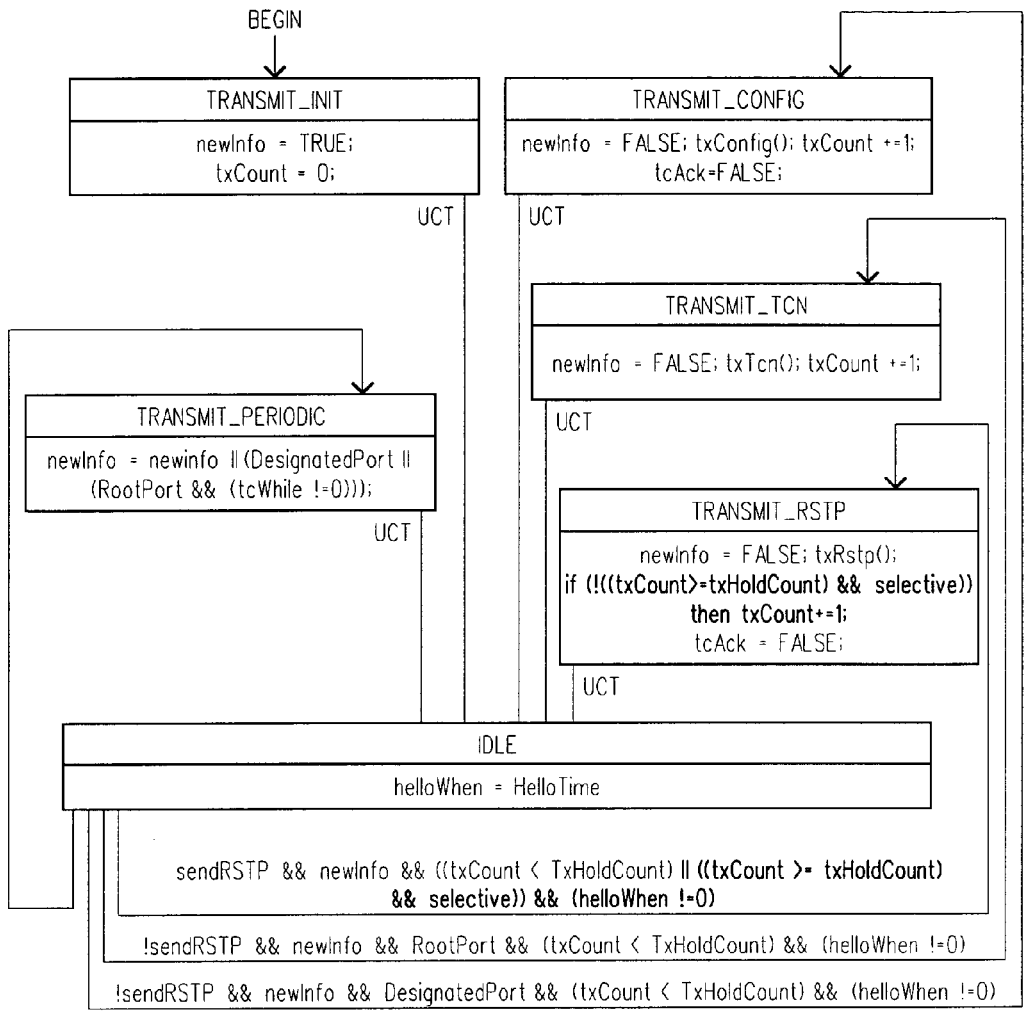
Figures 8D, 8E:
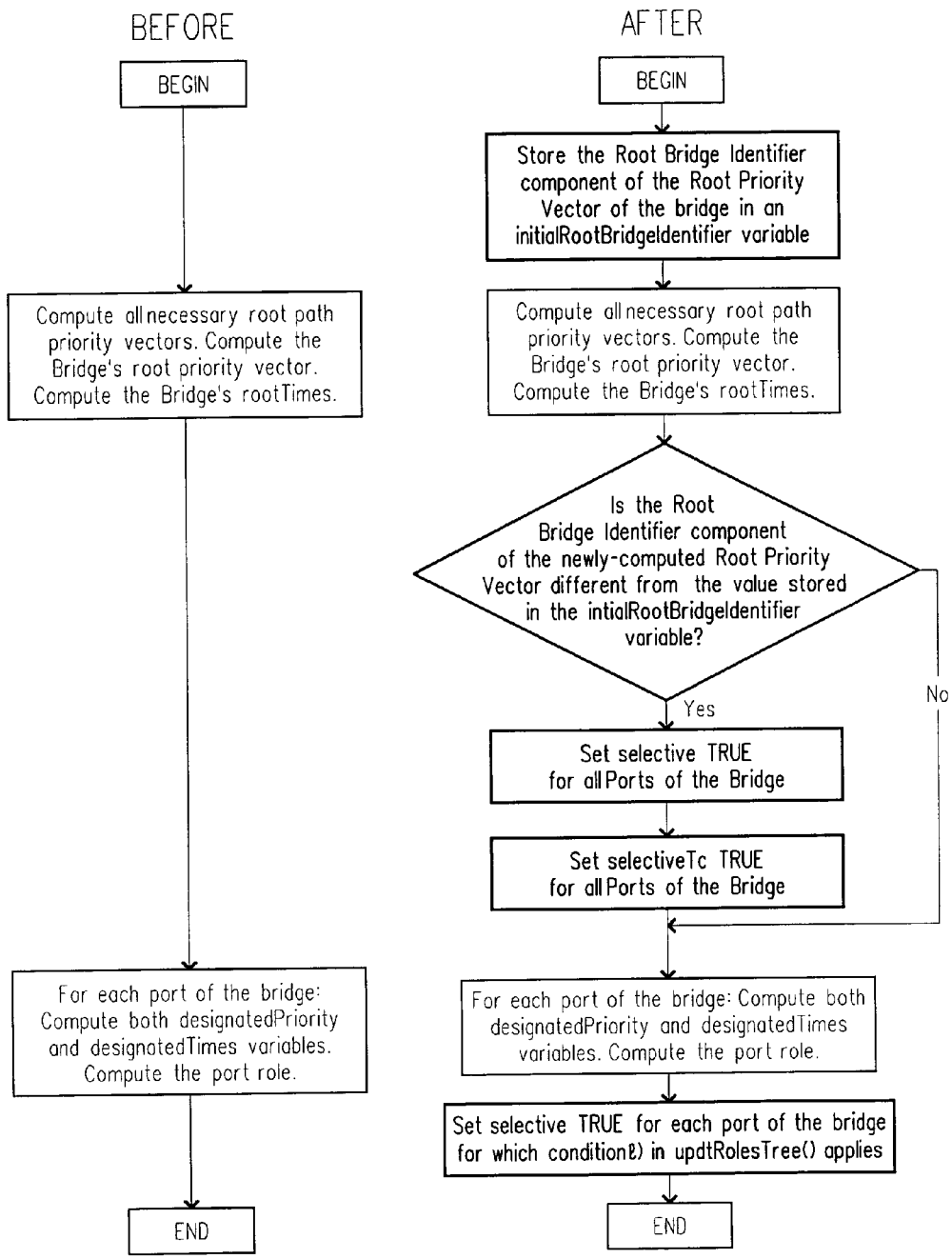
Figure 8F:
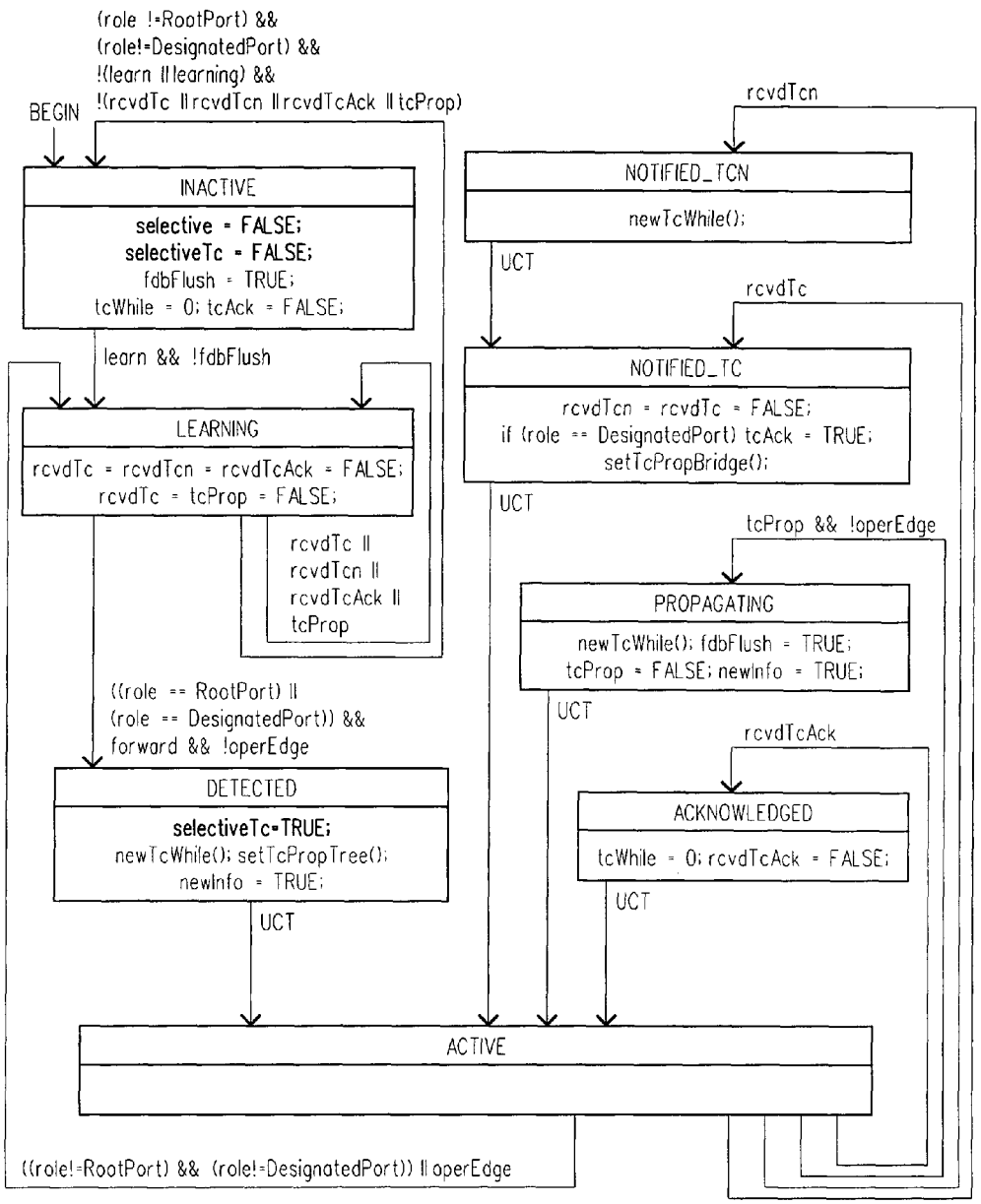
Figure 8G:
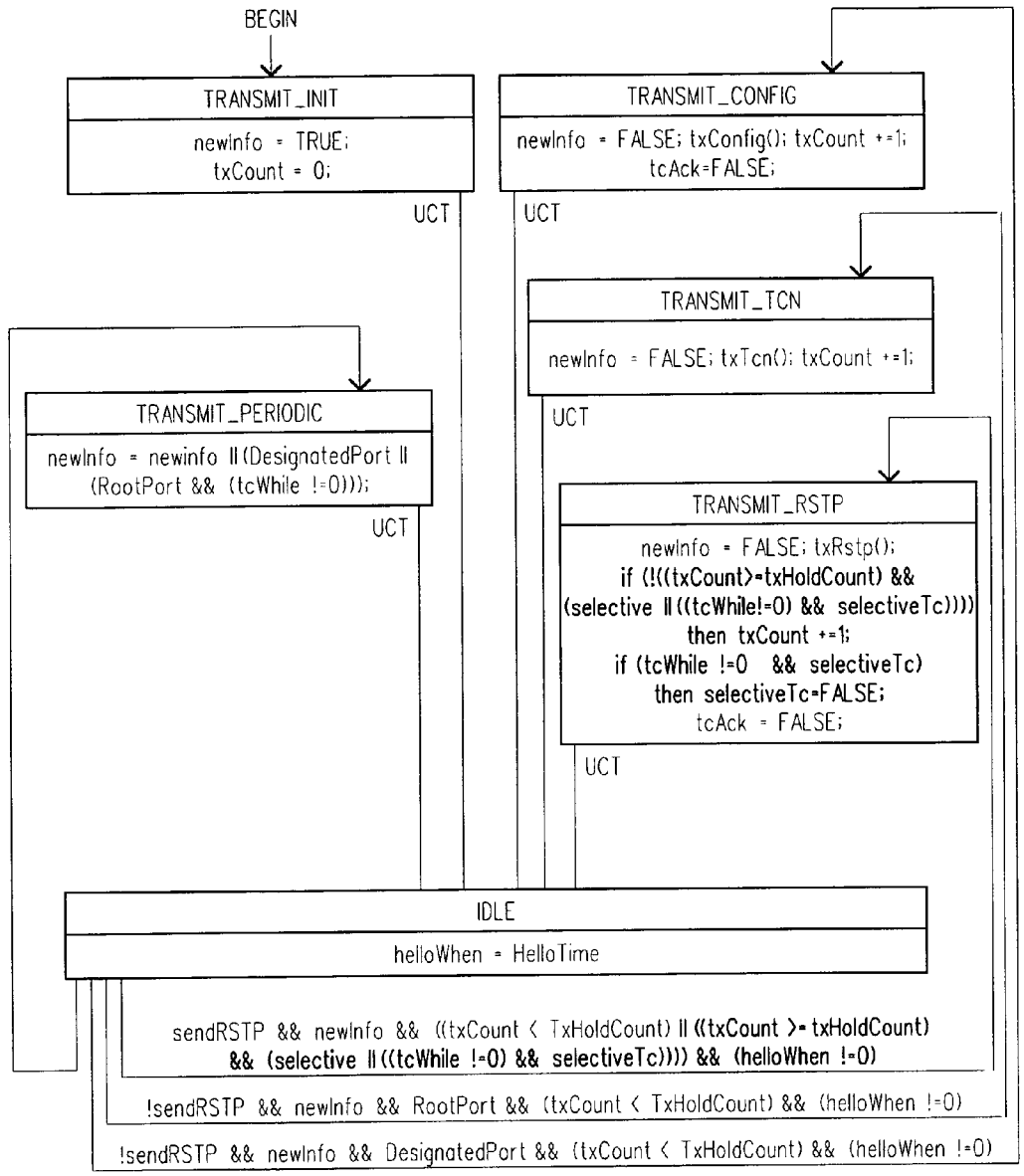
Figure 9A:
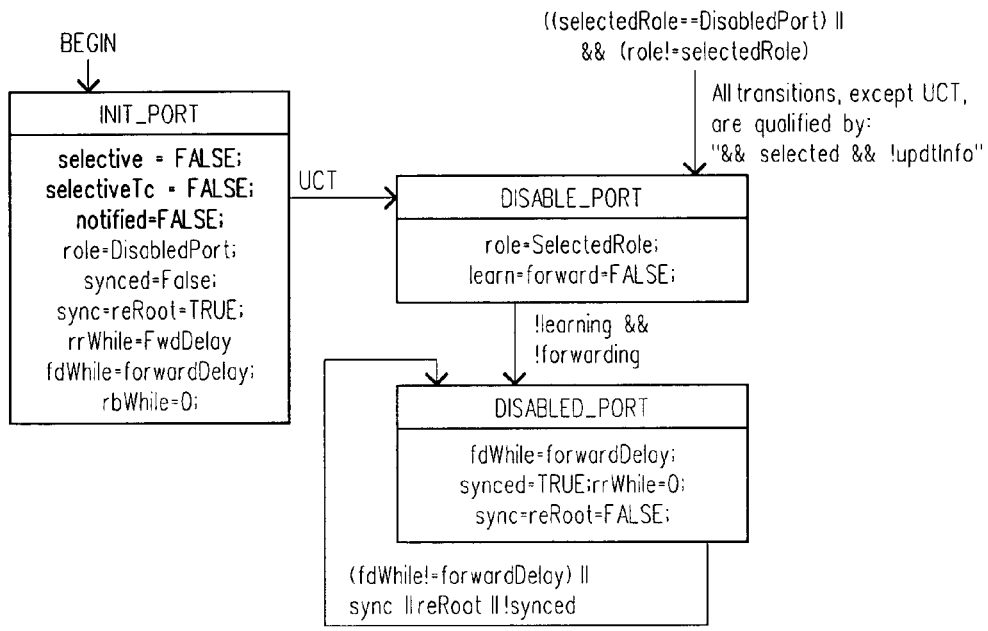
FIG. 9A is a flowchart that illustrates how to modify the traditional IEEE P802.1D-2003/D3 in accordance with Set#3 in TABLE #2 to implement method 300.

Reset selective on all ports that become inactive (this can be done in the Topology Change State Machine at the beginning of the INACTIVE state by adding a "selective=FALSE;" statement (see FIG. 7F).

Modify the condition on the transition from the IDLE state to the TRANSMIT_RSTP state in the Port Transmit State Machine to be as follows: "sendRSTP && newInfo && ((txCount<txHoldCount) || ((txCount>=txHoldCount) && selective)) && (helloWhen !=0) && selected && !updtInfo" (see FIG. 7C).

Modify the TRANSMIT_RSTP state in the Port Transmit State Machine so that "txCount+=1;" is not executed when "((txCount>=txHoldCount) && selective)" (see FIG. 7C).

Reset selective on all ports once a received BPDU has been processed in its entirety, which is the kind of processing that is assumed in this and subsequent possible implementations (i.e. do not allow, unless otherwise mentioned, the transmission of multiple BPDUs as a result of the processing of a received BPDU).

SET#2: Selective Transmission of "TCNs"

The previous set of modifications (Set#1) is complemented by other modifications to allow the selective transmission of necessary "BPDUs with the Topology Change flag set", referred to as "TCNs" (short for Topology Change Notification messages) hereafter. TCNs are generated and consequently transmitted over the entire topology to let bridges accordingly flush their Filtering Databases following a TC (short for Topology Change). Each participating bridge should receive at least one such TCN immediately following a TC (so as to ensure immediate flushing of outdated information in a bridge's Filtering Database). If reception of such a TCN is not immediate, some data frames may not be transmitted on the right ports. This is an undesirable effect, as data may not be forwarded to the right destination. The set of modifications described hereafter makes immediate transmission of necessary TCNs possible when a bridge:

Becomes a new Root Bridge.
   Reroots due to the fact that it received superior information from another bridge.
   Does not reroot but similarly has to advertise new superior information.
   Detects a TC on one of its ports.

This can be achieved by setting a variable named "selectiveTc" when those conditions are met. Transmission of a necessary TCN is allowed if the selectiveTc variable is set, if "tcWhile !=0" and if txcount has reached its txHoldCount limit.

Possible set of modifications (Set#2) to allow selective transmission of TCNs:

Apply all modifications of Set#1.
   Define a boolean variable named selectiveTc for each port of a bridge.
   Reset selectiveTc on all ports that are initialized (this can be done at the beginning of the INIT_PORT state in the Port Role Transition State Machine by adding a "selectiveTc=FALSE;" statement (see FIG. 8A)).
   Modify the updtRolesTree() and setReRootTree() procedures as described in Set#1 and change the content of each "shaded" box so that it reads: "Set selective TRUE for all Ports of the Bridge. Set selectiveTc TRUE for all Ports of the Bridge" (see FIGS. 8B-8E).
   Set selectiveTc on all ports when a TC is detected on one of the ports (this can be done at the beginning of the DETECTED state in the Topology Change State Machine (see FIG. 8F).
   Reset selectiveTc on all ports that become inactive (this can be done at the beginning of the INACTIVE state in the Topology Change State Machine by adding a "selectiveTc=FALSE;" statement (see FIG. 8F).
   Modify the condition on the transition from the IDLE state to the TRANSMIT_RSTP state in the Port Transmit State Machine to be: "sendRSTP && newinfo && ((txCount<txHoldCount) || ((txCount>=txHoldCount) && (selective || ((tcWhile !=0) && selectiveTc)))) && (helloWhen !=0) && selected && !updtInfo" (see FIG. 8G). Checking that "tcWhile !=0" ensures that no extra BPDU is transmitted that would not have its TC flag set. This is because selectiveTc aims at the selective transmission of TCNs.

Modify the TRANSMIT_RSTP state in the Port Transmit State Machine so that:
      "txCount+=1;" is not executed when "((txCount>=txHoldCount) && (selective || ((tcWhile !=0) && selectiveTc)))" AND,
      selectiveTc is reset after a BPDU has been transmitted by the txRstp() procedure AND when "tcWhile !=0", which means that the transmitted BPDU had its TC flag set (see FIG. 8G).

SET#3 & 4: Improved Selective Transmission of "TCNs"

The modifications described in Set#2 require txHoldCount to be set to at least 2 for proper working of the solution: txHoldCount should not be set to 1. This is because some bridges in the topology may not be aware of a TC but still have to propagate at least one TCN on each active port other than the port notified of a TC by a received TCN. Assuming, as it is so far assumed, that RSTP is stable and that no event altered the topology for some time, txCount should hold a value of 0 or 1 on each port of any bridge in the topology. A value of 1 on a port would be due for instance to a "Hello Message" being transmitted before txCount is reset (as it is at one-second intervals). Consequently, if txCount holds a value of 1 and txHoldCount is set to 1, no TCN can be immediately transmitted on the port (unless the "((txCount>=txHoldCount) && (selective || ((tcWhile!=0) && selectiveTc)))" condition is verified on that port, which may not be the case on all ports of all bridges in the topology). Alternatively, a TCN can be transmitted if txHoldCount is set to 2 in these conditions. Two mechanisms can be envisaged to allow txHoldCount to be set to any value including the value 1 without impairing reconvergence time.

The first mechanism is described next before its drawbacks are outlined. A description of the second one is then provided that addresses those drawbacks.

SET#3: Propagation of the first "TCN"

The first mechanism allows the propagation of the first TCN received by a port (i.e. a TCN received on a port where tcWhile==0). The propagation of TCNs subsequently received has to be limited by the standard transmission rate limiter so as to avoid unnecessary flushing in the topology.

Possible set of modifications (Set#3) for implementation of the first mechanism:

Apply all modifications of Set#1 and Set#2.
   Define a boolean variable named notified for each port of a bridge.
   Reset notified on all ports that are initialized (this can be done at the beginning of the INIT_PORT state in the Disabled Port Role Transitions State Machine by adding a "notified=FALSE;" statement (see FIG. 9A).
   Reset notified on any port where (tcWhile==0) (for example, every time the tcWhile timer expires).
   On any port entering the NOTIFIED_TC state in the Topology Change State Machine and for which (notified==FALSE):
   Set notified.
   Reset selectiveTc.
   Set selectiveTc on all other ports of the bridge.

SET#4, 5 & 6: Topology Change Pre-Notification & Options

SET#4: Topology Change Pre-Notification

The modifications described in Set#3 provide a satisfactory solution assuming, as it is so far assumed, that RSTP is stable and that no event altered the topology for some time (txCount holds a value of 0 or 1 on each port of any bridge in the topology as previously described). Those are customary conditions. Non-customary conditions (i.e. that can happen albeit more rarely) involve the detection of a TC and its subsequent propagation in a TCN that would be received by a port where a TCN has been received recently (notified is still TRUE, tcWhile !=0). This can occur during conditions such as the following:

Failure a few milliseconds or seconds after initial reconvergence or,

Reconvergence followed within a few milliseconds or seconds by another event in the topology requiring a new reconvergence.

When more than one TCN is received (while tcWhile !=0), a port is not capable of knowing whether they are due to the same TC or not. The second mechanism provides a way of making that decision. It is an alternative to what is provided by both Set#2 and Set#3.

The second mechanism monitors the detection of a TC on any port of a bridge. Upon detection of a TC, it transmits a "Topology Change Pre-Notification" BPDU (TCPN) on all Root or Designated Ports in the Forwarding state that are not Edge Ports. TCPNs are accepted on other bridges by other Root or Designated Ports in the Forwarding state that are not Edge Ports. Those receiving ports trigger the transmission of TCPNs on all Root or Designated Ports in the Forwarding state that are not Edge Ports: This can be referred to as the propagation of a TCPN. Such propagation eventually stops when a TCPN reaches a bridge whose ports other than the receiving ports are not Root or Designated Ports in the Forwarding state that are not Edge Ports (e.g. a port in the Discarding or Learning state, an Edge Port, etc.). Once a TCPN is received, a bridge allows the propagation of the next received TCN.

A TCPN is a BPDU as generated by the txRstp() procedure (see section 17.21.20 in IEEE P802.1D-2003/D3) except that:

The following flags in Octet 5 of a BPDU are reset: The Topology Change, Proposal, Agreement, and Topology Change Acknowledgment flags hold a value of zero. This is to avoid triggering any special reaction other than the harmless update of rcvdInfoWhile.

The two bits representing the Port Role in Octet 5 of a BPDU are reset (Unknown Port Role—see section 9.2.9 in IEEE P802.1D-2003/D3): This is primarily how a TCPN is distinguished from other BPDUs.

Additionally, the second mechanism allows the selective transmission of necessary BPDUs as previously described in Set#1 but also when a bridge finds a less costly path to the Root Bridge.

Figure 10A:
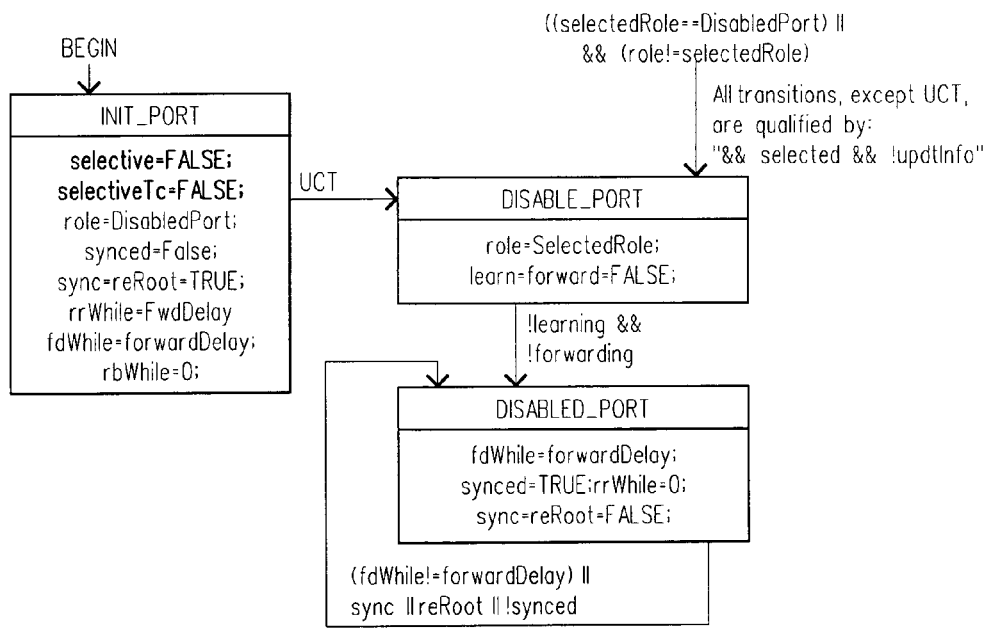
FIGS. 10A-10F are flowcharts and diagrams that illustrate how to modify the traditional IEEE P802.1D-2003/D3 in accordance with Set#4 in TABLE #2 to implement method 300.
Figures 10B, 10C:
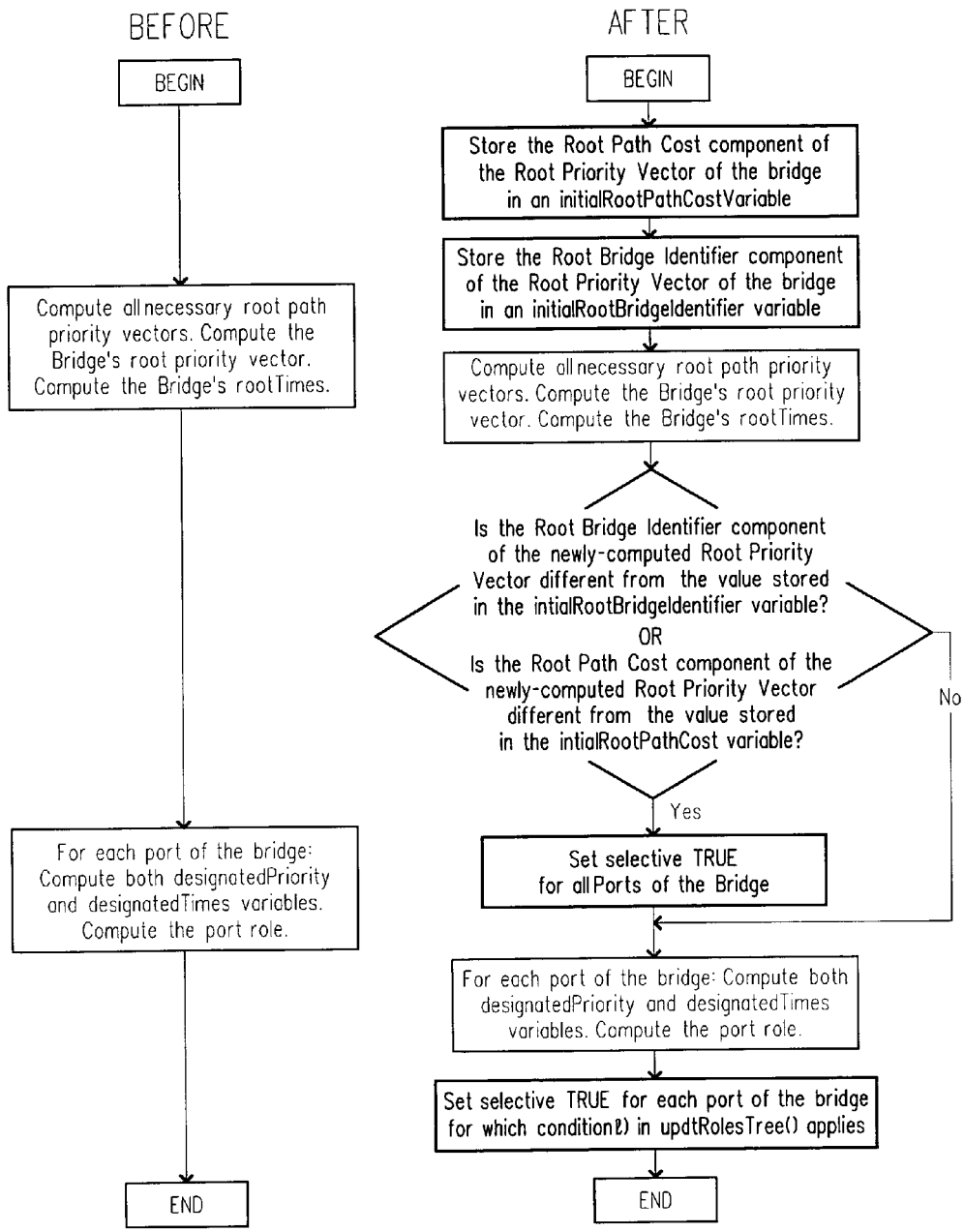

Possible set of modifications (Set#4) for implementation of the second mechanism:

Apply all modifications of Set#1 but modify the updtRolesTree() procedure to detect a less costly path to the Root Bridge as shown in FIGS. 10B and 10C.

Define a boolean variable named selectiveTc for each port of a bridge.

Reset selectiveTc on all ports that are initialized (this can be done in the Disabled Port Role Transitions State Machine at the beginning of the INIT_PORT state by adding a "selectiveTc=FALSE;" statement (see FIG. 10A).

Set selectiveTc and attempt, before any regular BPDU with the TC flag set is transmitted, the transmission of a TCPN:

On all ports (verifying "((role==ROOT || role==DESIGNATED) && forward && !oper Edge)") when a TC is detected by one of the ports. This can be done in the Topology Change State Machine at the beginning of the DETECTED state (see FIG. 10D).

On all other ports (verifying "((role==ROOT || role==DESIGNATED) && forward && !operEdge)") when a TCPN is received by one of the ports verifying "((role==ROOT || role==DESIGNATED) && forward && !operEdge)". This can be done at the beginning of both:

The OTHER state in the Port Information State Machine.

The REPEATED_DESIGNATED state in the Port Information State Machine but only when the received message (TCPN BPDU) does not convey a Designated Port Role and when it respects the format of a TCPN as described previously (see FIG. 10E).

Figure 10D:
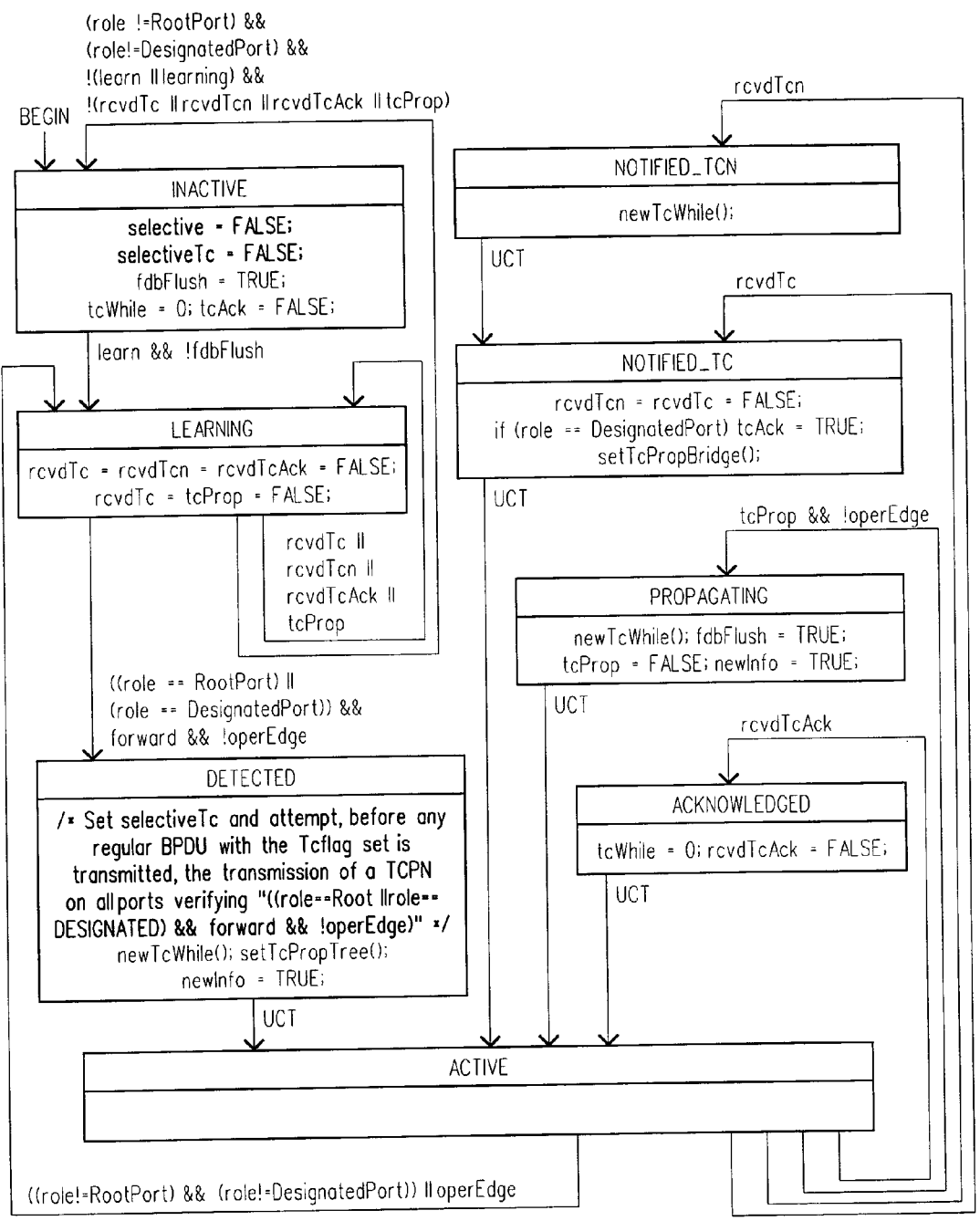
Figure 10E:
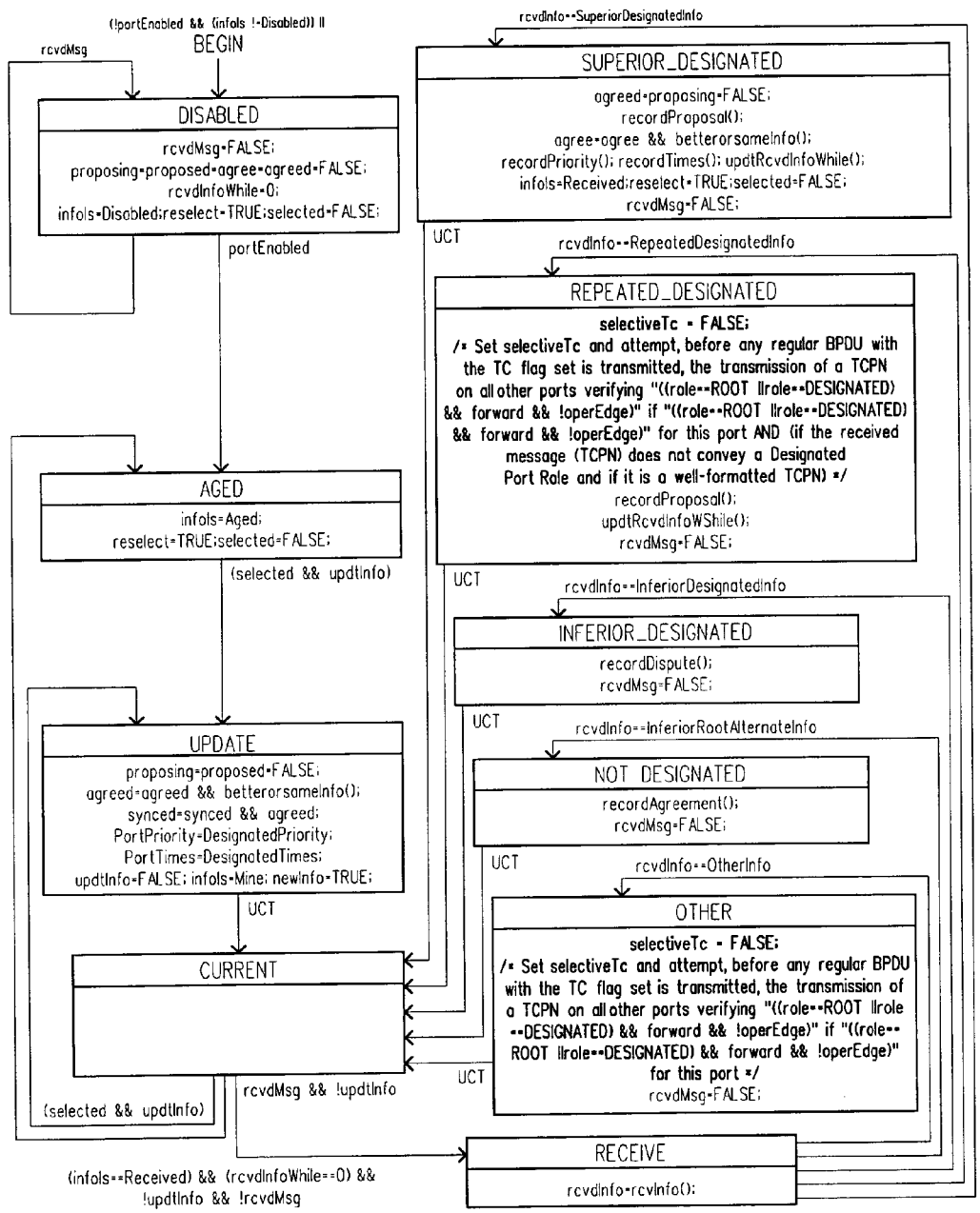

Reset selectiveTc on all ports that become inactive (this can be done in the Topology Change State Machineat the beginning of the INACTIVE state by adding a selectiveTc=FALSE statement (see FIG. 10D).

Modify the condition on the transition in the Port Transmit State Machine from the IDLE state to the TRANSMIT_RSTP state as follows: "sendRSTP && newinfo && ((txCount<txHoldCount) || ((txCount>=txHoldCount) && (selective || ((tcWhile !=0) && selectiveTc)))) && (helloWhen !=0) && selected && !updtInfo". Checking that "tcWhile !=0" ensures that no extra BPDU is transmitted that would not have its TC flag set (see FIG. 10F). This is because selectiveTc aims at the selective transmission of TCNs.

Figure 10F:
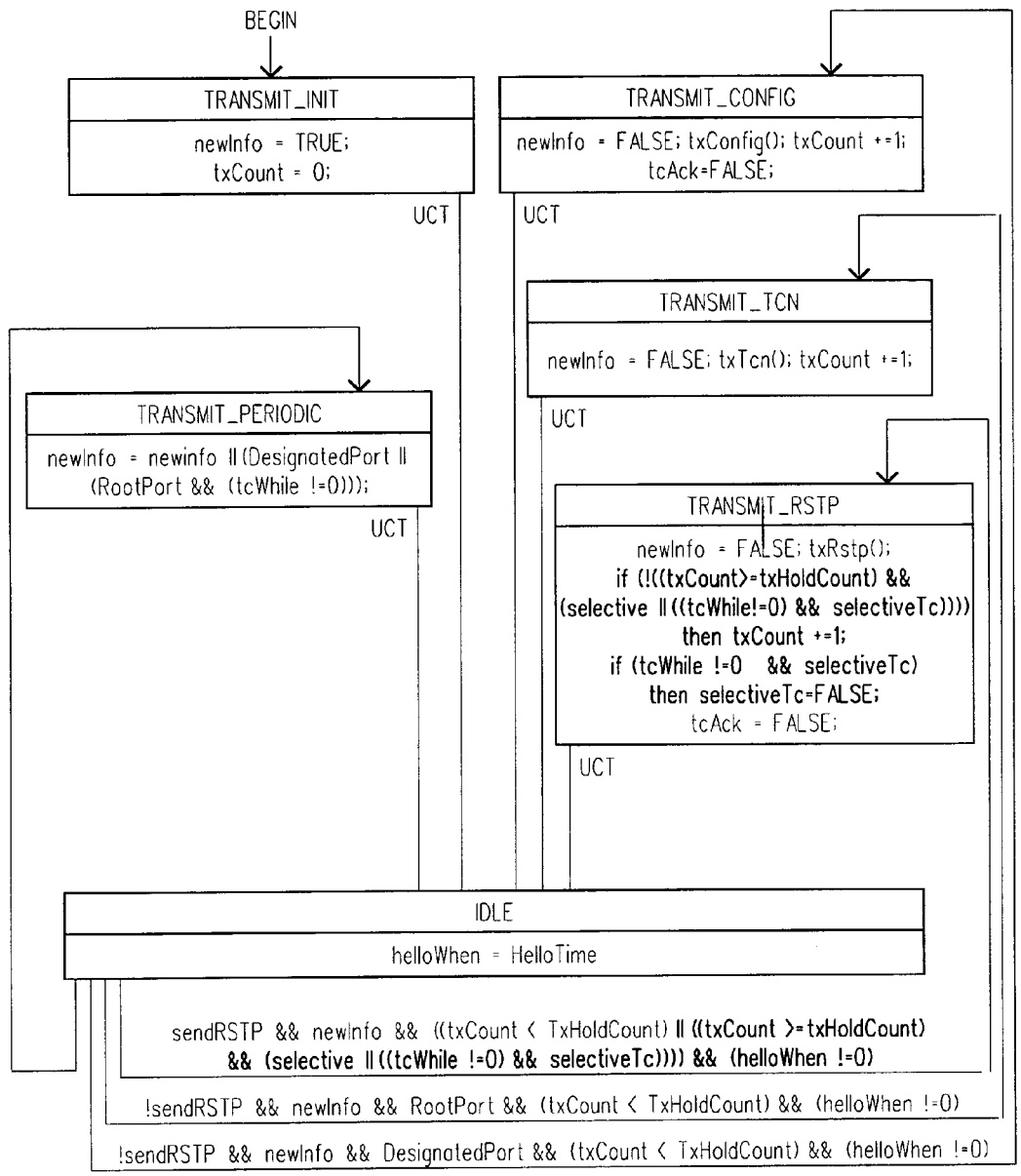
Figure 11A:
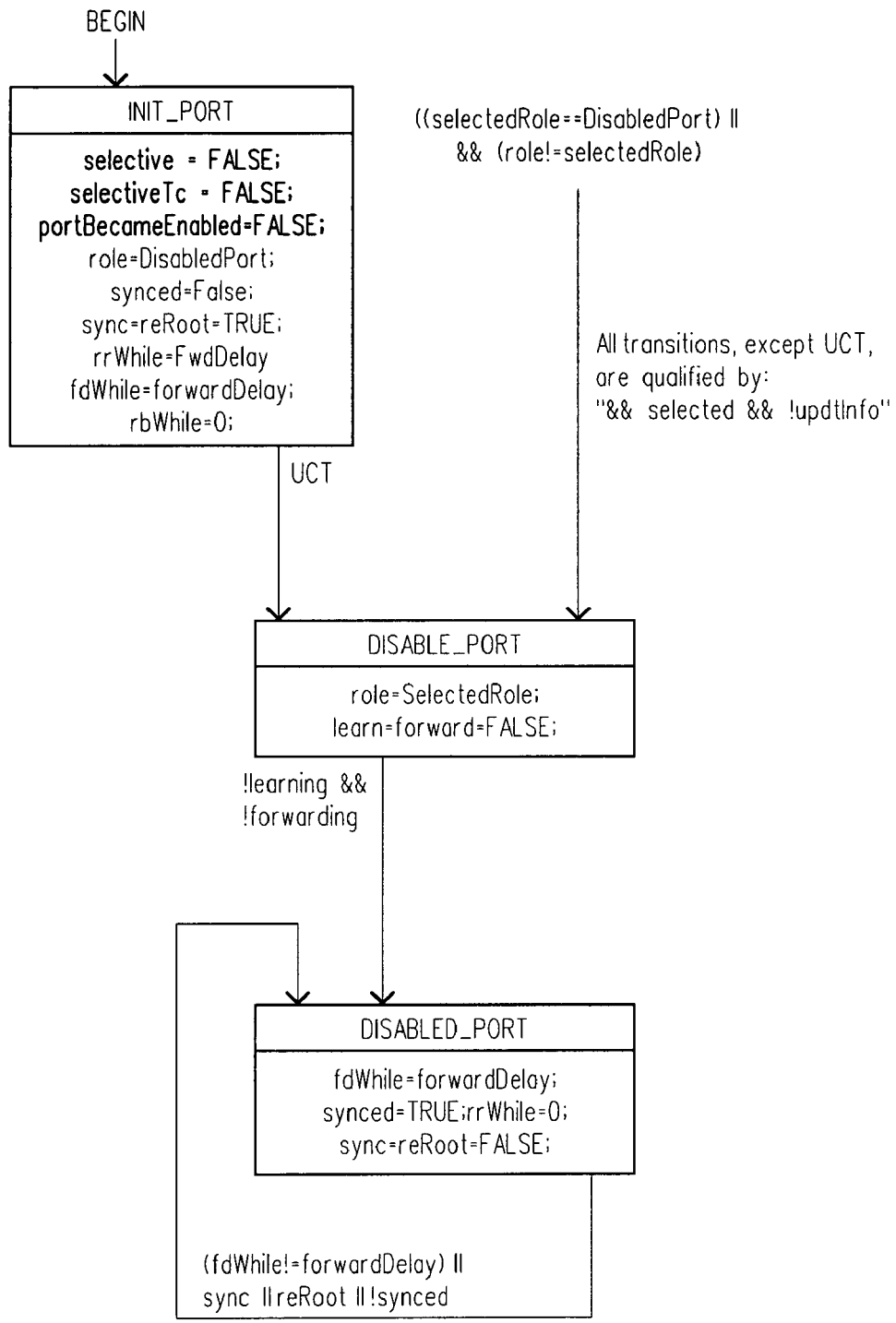
FIGS. 11A-11B are flowcharts and diagrams that illustrate how to modify the traditional IEEE P802.1D-2003/D3 in accordance with Set#5 in TABLE #2 to implement method 300.
Figure 11B:
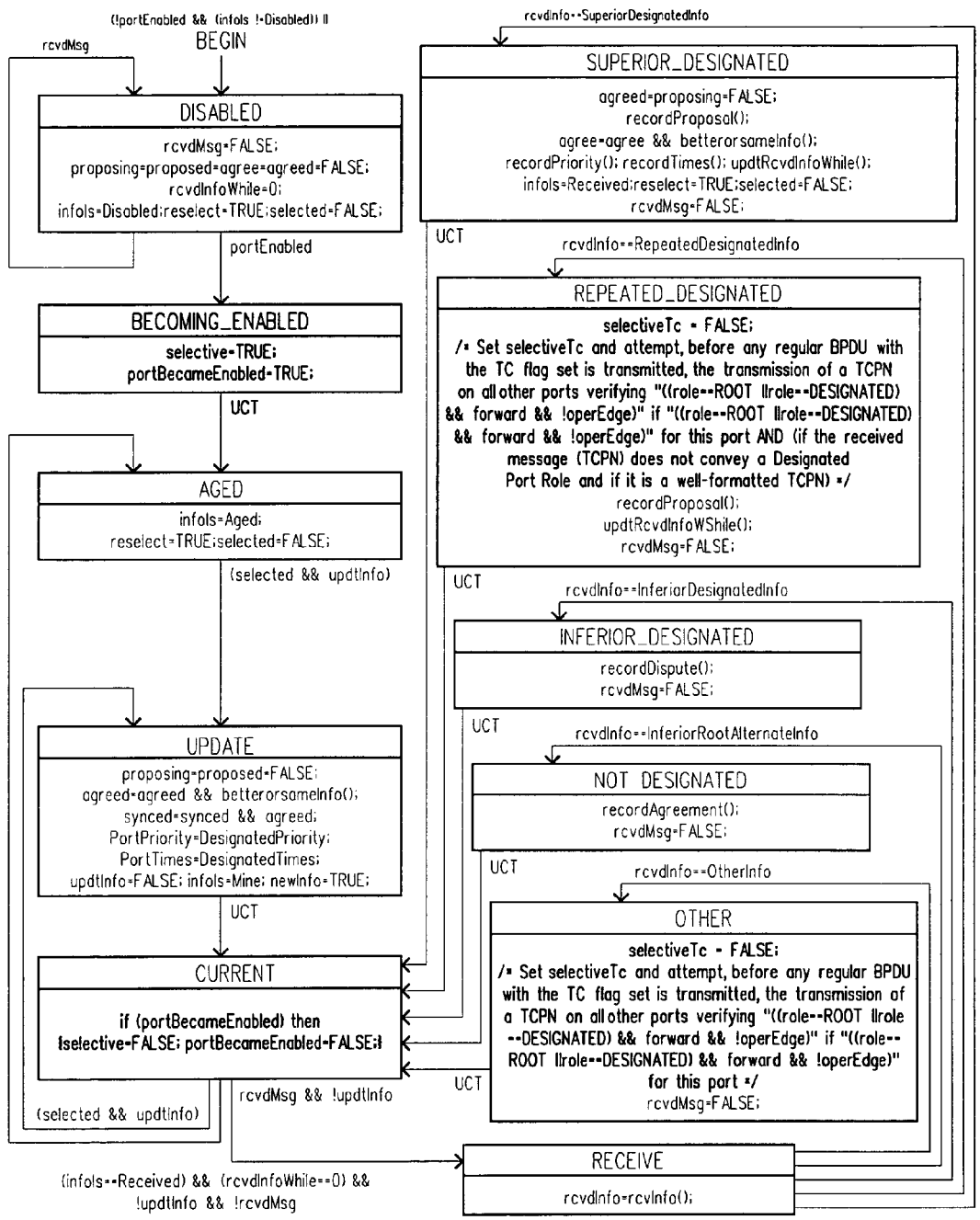
Figure 12A:
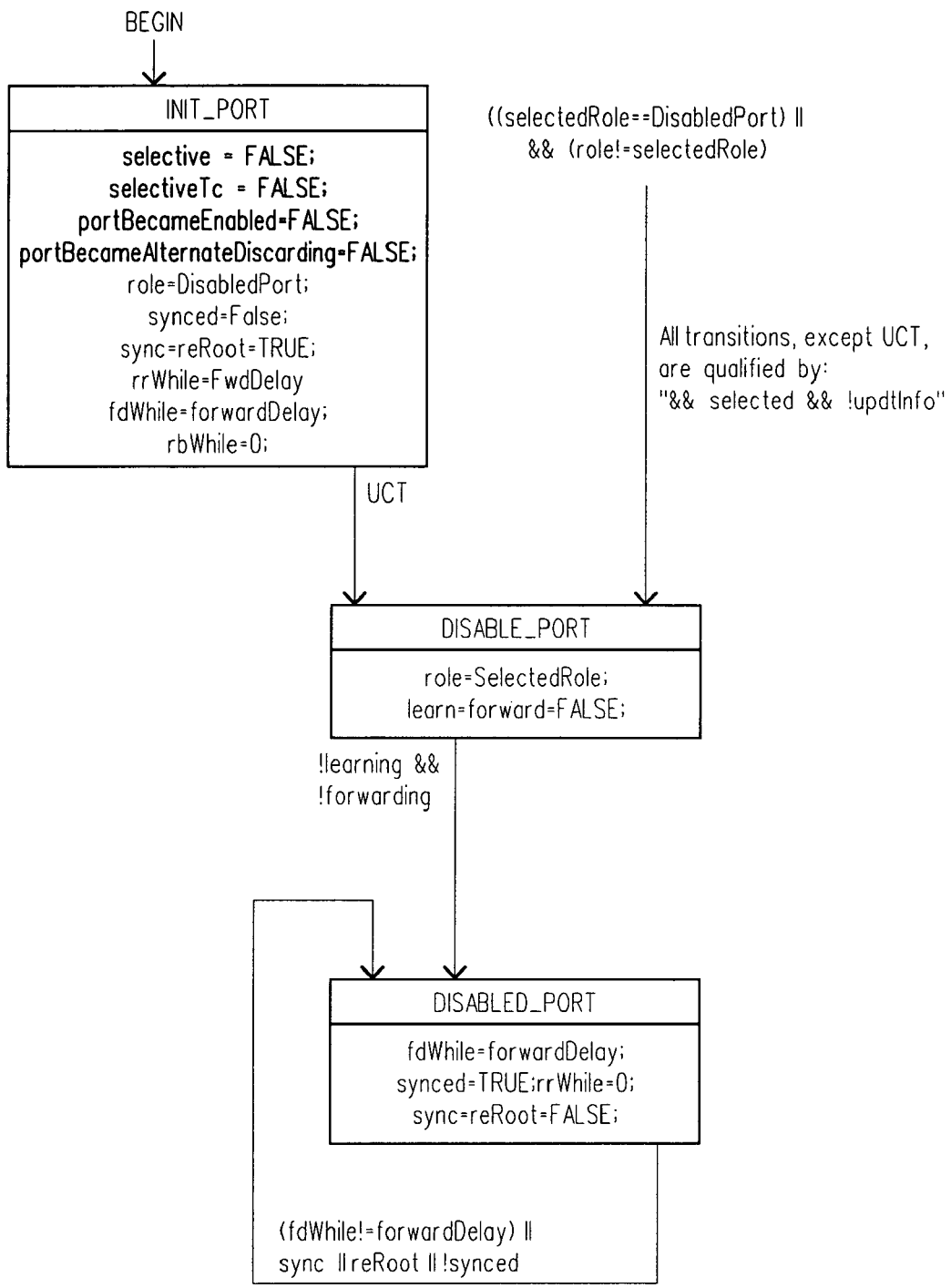
FIGS. 12A-12B are flowcharts and diagrams that illustrate how to modify the traditional IEEE P802.1D-2003/D3 in accordance with Set#6 in TABLE #2 to implement method 300.
Figure 12B:
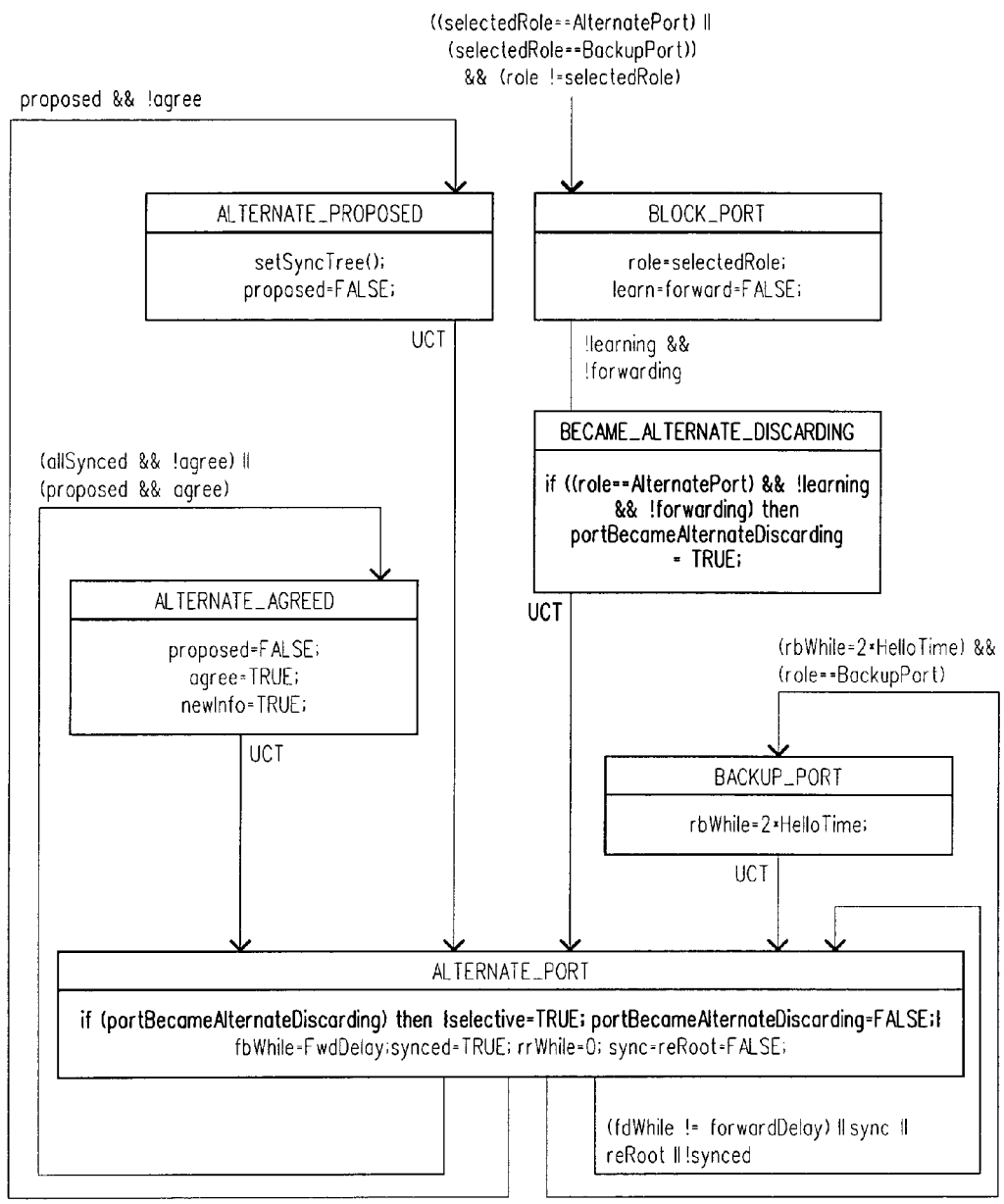

Modify the TRANSMIT_RSTP state in the Port Transmit State Machine so that:

"txCount+=1;" is not executed when "((txCount>=txHoldCount) && (selective || ((tcWhile !=0) && selectiveTc)))" AND, selectiveTc is reset after a BPDU has been transmitted by the txRstp() procedure AND when "tcWhile !=0", which means that the transmitted BPDU had its TC flag set (see FIG. 10F).

The transmission of a TCPN always precedes (during the processing of a received BPDU) the transmission of a regular BPDU and is independent. This can be done by replacing newinfo with "newinfo && !newInfoTCPN" in the condition on the transition from the IDLE state to the TRANSMIT_RSTP state in the Port Transmit State Machine where newInfoTCPN is a boolean set if a TCPN is to be (immediately) transmitted. newInfoTCPN would be reset in a new TRANSMIT_TCPN state that would be part of the Port Transmit state machine. This new state might reuse txRstp() to transmit a well-formatted TCPN only when the transmitting port is a Root or Designated Port in the Forwarding state that is not an Edge Port. The state would be entered from the IDLE state when "sendRSTP && newInfoTCPN && (helloWhen !=0) && selected && !updtInfo" and would exit to the IDLE state through an UnConditional Transition (UCT). It should be noted that txCount should not be incremented by one when a TCPN is transmitted by a port. Finally, care should be exercised to avoid deadlocks due to newInfoTCPN being set (e.g. the condition to the TRANSMIT_RSTP state might have to be further modified).

The use of TCPNs could be standardized but need not be as it is interoperable with existing RSTP-based bridges. Standardization might include a Pre-Notification bit in a regular BPDU that would provide the same functionality as a TCPN without the extra BPDU. Interoperability with existing RSTP-based bridges is ensured: IEEE P802.1D-2003-2003 claims that, although "the Unknown value of Port Role cannot be generated by a valid implementation of 802.1D-2003 . . . , this value is accepted on receipt." The standard also notes that "If the Unknown value of the Port Role parameter is received, the state machines will effectively treat the RST BPDU as if it were a Configuration BPDU." (see section 9.2.9 in IEEE P802.1D-2003-2003).

SET#5: Port Becoming Enabled

The set of modifications provided by Set#4 has to be complemented by those of Set#5 as described next. Set#5 allows a port that is becoming enabled (e.g. when a link that was lost is brought back up within a very short period of time) to transmit any necessary BPDU for immediate reconvergence to start.

Possible set of modifications (Set#5):
  Apply all modifications of Set#4.
  Define a boolean variable named portBecameEnabled for each port of a bridge.
  Reset portBecameEnabled on all ports that are initialized (this can be done in the Disabled Port Role Transition State Machine at the beginning of the INIT_PORT state by adding a "portBecameEnabled=FALSE;" statement (see FIG. 11A).
  Set both selective and portBecameEnabled when a transition occurs between the DISABLED and AGED states in the Disabled Port Information State Machine (portEnabled becomes TRUE (see FIG. 11B).
  Reset both selective and portBecameEnabled, if portBecameEnabled is set, in the CURRENT state in the Port Information State Machine (see FIG. 11B).

SET#6: Port Becoming Alternate Discarding

The set of modifications provided by Set#5 may optionally be complemented by those of Set#6 as described next. Set#6 allows a port that is becoming an Alternate Port and that is transiting to the Discarding state to transmit any BPDU necessary for the port on the other side of the link to transit to its final state. This is optional because that other port should be a Designated Port in the Discarding state waiting to transit to the Forwarding state. Assuming, as it is so far assumed, that the link is a point-to-point link, no data service user can be connected to that remote Designated Port. As a consequence its transiting to the Forwarding state does not improve the service provided to the data service user. However, such a transition leads to a more stable RSTP faster, which is desirable.

Possible set of modifications (Set#6):
  Apply all modifications of Set#5.
  Define a boolean variable named portBecameAlternateDiscarding for each port of a bridge.
  Reset portBecameAlternateDiscarding on all ports that are initialized (this can be done in the Disabled Port Role Transitions State Machine at the beginning of the INIT_PORT state by adding a "portBecameAlternateDiscarding=FALSE;" statement (see FIG. 12A).
  Set portBecameAlternateDiscarding when a transition occurs between the BLOCK_PORT and ALTERNATE_PORT states AND only if "((role==AlternatePort) && !learning && !forwarding)" (see FIG. 12B).
  Set selective and reset portBecameAlternateDiscarding, if portBecameAlternateDiscarding is set, in the ALTERNATE_AGREED state (see FIG. 12B).

It should be appreciated that further modifications may be needed to the state machines shown in FIGS. 7-12 in addition to the BOLD statement(s) to ensure fault-free operation in accordance with the present invention.

Following are some advantages resulting from the use of method 300:

In ring topologies the RSTP reconvergence of the network can take more than a second but when method 300 is used to enhance the RSTP then the reconvergence time can take a few milliseconds.

It should be noted that a bridge 104 (e.g., RSTP-based layer devices) implementing method 300 can interwork with a bridge that does not implement method 300.

A network administrator might not have to set the txHoldCount parameter to obtain the best re/convergence times when method 300 is implemented. However, it should be noted that this parameter might have to be set to at least 2 depending on which variant of method 300 is implemented.

More BPDUs 204 can be exchanged when implementing method 300, which can contribute to the temporary saturation of the network 100. It should be appreciated that a slight increase in the number of transmitted BPDUs 204 over a potentially shorter reconvergence period can be preferable to a constant flow of transmitted BPDUs 204 during a potentially much longer reconvergence period. Moreover the recommendation that new BPDUs 204 are transmitted only after an incoming/received BPDU 204 has been entirely processed helps in maintaining a relatively low number of exchanged BPDUs.

The RSTP enhanced by method 300 can enable applications that expect below fifty-millisecond reconvergence times and consider anything above this threshold beyond acceptable limits.

The RSTP enhanced by method 300 need not be subjected to standardization because the method 300 can interwork perfectly with existing RSTP-based layer 2 devices such as bridges, switches and routers. For example, the enhanced RSTP can be used by devices in Alcatel's "Birds Of Prey" product family.

It should be appreciated that the particular implementations of method 300 shown in FIGS. 7-12 are not the only ways to implement the present invention. Again, it should also be appreciated that these modifications take place in the spanning tree protocol entity 202 of an IEEE P802.1D-2003/D3-compliant bridge 104 or a bridge compliant with any backward-compatible version of this IEEE standard.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A method for selectively eliminating latencies in the exchange of control messages within a network during the reconvergence or convergence of the network, said method comprising the steps of:
classifying to-be-transmitted control messages into either low-priority control messages or high-priority control messages;
limiting the transmission rate of the low-priority control messages such that when a transmit parameter has a value that reaches a predetermined limit which is set by a transmit hold parameter then the low-priority control messages are not transmitted until the value of the transmit parameter is decremented; and
immediately transmitting the high-priority control messages by removing a restriction imposed on the transmit parameter by the transmit hold parameter, wherein the high-priority control messages contain information used by at least one remote bridge to aid in the reconvergence or convergence of an unstable topology to a stable topology in the network.

2. The method of claim 1, wherein the network is a RSTP-based network, the control messages are Bridge Protocol Data Units, the transmit parameter is a txCount parameter, and the transmit hold parameter is a txHoldCount parameter.

3. The method of claim 1, wherein the high-priority control messages are created when a bridge in the network becomes a new root bridge.

4. The method of claim 1, wherein the high-priority control messages are created when a bridge in the network has to reroot a port towards a new root bridge.

5. The method of claim 1, wherein the high-priority control messages are created when a bridge in the network has to advertise information about a new root bridge to another bridge.

6. The method of claim 1, wherein the high-priority control messages are created when a bridge detects a topology change on one of its ports.

7. A network comprising:
a plurality of links;
a plurality of bridges coupled to the links, each bridge executing a protocol that selectively eliminates latencies in the exchange of control messages between bridges during the re/convergence of the network by:
classifying to-be-transmitted control messages into either low-priority control messages or high-priority control messages;
limiting the transmission rate of the low-priority control messages such that when a transmit parameter has a value that reaches a predetermined limit which is set by a transmit hold parameter then the low-priority control messages are not transmitted until the value of the transmit parameter is decremented; and
immediately transmitting the high-priority control messages by removing a restriction imposed on the transmit parameter by the transmit hold parameter, wherein the high-priority control messages contain information which will be used by at least one remote bridge to aid in the reconvergence or convergence of an unstable topology to a stable topology in the network.

8. The network of claim 7, wherein the high-priority control messages are created when one of the bridges in the network becomes a new root bridge.

9. The network of claim 7, wherein the high-priority control messages are created when one of the bridges in the network has to reroot a port towards a new root bridge.

10. The network of claim 7, wherein the high-priority control messages are created when one of the bridges in the network has to advertise information about a new root bridge to another bridge.

11. The network of claim 7, wherein the high-priority control messages are created when a bridge detects a topology change on one of its ports.

12. The network of claim 7, wherein the network is a RSTP-based network.

13. The network of claim 7, wherein the network is a local area network.

14. The network of claim 7, wherein the network is a bridged local area network.

15. The network of claim 7, wherein the network is a metropolitan area network.

16. A device comprising:
a plurality of state machines that selectively eliminates latencies in the exchange of control messages during the reconvergence or convergence of a network by:
classifying to-be-transmitted control messages into either low-priority control messages or high-priority control messages;
limiting the transmission rate of the low-priority control messages such that when a transmit parameter has a value that reaches a predetermined limit which is set by a transmit hold parameter then the low-priority control messages are not transmitted until the value of the transmit parameter is decremented; and
immediately transmitting the high-priority control messages by removing a restriction imposed on the transmit parameter by the transmit hold parameter, wherein the high-priority control messages contain information used by at least one remote bridge to aid in the re/convergence of an unstable topology to a stable topology in the network.

17. The device of claim 16, wherein said device is at layer 2 of the Open Systems Interconnection reference model.

18. The device of claim 16, wherein said device is a bridge, switch or router.

* * * * *